US008203699B2

(12) United States Patent
Bamji et al.

(10) Patent No.: US 8,203,699 B2
(45) Date of Patent: Jun. 19, 2012

(54) SYSTEM ARCHITECTURE DESIGN FOR TIME-OF-FLIGHT SYSTEM HAVING REDUCED DIFFERENTIAL PIXEL SIZE, AND TIME-OF-FLIGHT SYSTEMS SO DESIGNED

(75) Inventors: Cyrus Bamji, Fremont, CA (US); Swati Mehta, San Jose, CA (US)

(73) Assignee: Microsoft Corporation, Redmond, WA (US)

( * ) Notice: Subject to any disclaimer, the term of this patent is extended or adjusted under 35 U.S.C. 154(b) by 344 days.

(21) Appl. No.: 12/459,160

(22) Filed: Jun. 26, 2009

(65) Prior Publication Data
US 2011/0304841 A1   Dec. 15, 2011

Related U.S. Application Data

(60) Provisional application No. 61/133,647, filed on Jun. 30, 2008.

(51) Int. Cl.
G01C 3/08   (2006.01)
(52) U.S. Cl. ...................................................... 356/5.01
(58) Field of Classification Search .................. 356/5.01, 356/4.01
See application file for complete search history.

(56) References Cited

U.S. PATENT DOCUMENTS

| 6,522,395 | B1 * | 2/2003 | Bamji et al. | 356/5.01 |
| 7,283,213 | B2 * | 10/2007 | O'Connor et al. | 356/5.11 |
| 7,379,163 | B2 * | 5/2008 | Rafii et al. | 356/4.07 |
| 7,408,627 | B2 * | 8/2008 | Bamji et al. | 356/5.01 |
| 7,450,220 | B2 * | 11/2008 | O'Connor et al. | 356/5.1 |
| 7,464,351 | B2 * | 12/2008 | Bamji et al. | 716/50 |
| 7,636,150 | B1 * | 12/2009 | McCauley et al. | 356/5.01 |
| 7,791,715 | B1 * | 9/2010 | Bamji | 356/5.1 |
| 7,796,239 | B2 * | 9/2010 | Sawachi | 356/5.1 |
| 2006/0176467 | A1 * | 8/2006 | Rafii et al. | 356/4.07 |
| 2006/0176469 | A1 * | 8/2006 | O'Connor et al. | 356/5.11 |
| 2006/0197937 | A1 * | 9/2006 | Bamji et al. | 356/5.01 |

* cited by examiner

Primary Examiner — Gregory C Issing
Assistant Examiner — Antoine J Bedard
(74) Attorney, Agent, or Firm — Vierra Magen Marcus & DeNiro LLP

(57) ABSTRACT

Embodiments of the present invention provide methods to produce a high performance, feature rich TOF system, phase-based or otherwise using small TOF pixels, single-ended or preferably differential, as well as TOF systems so designed. IC chip area required for pixels is reduced by intelligently off-loading or removing from within the pixel certain components and/or functionality. In some embodiments during a single TOF system capture period, analog values from each pixel are repeatedly sampled and converted to digital values, which are combined and manipulated on the sensor chip. Combining this plurality of values enables appropriately compact data from the sensor chip. Embodiments of the present invention implement a TOF system with high ambient light resilience, high dynamic range, low motion blur and dealiasing support, while advantageously reducing pixel area size relative to prior art TOF pixels.

20 Claims, 17 Drawing Sheets

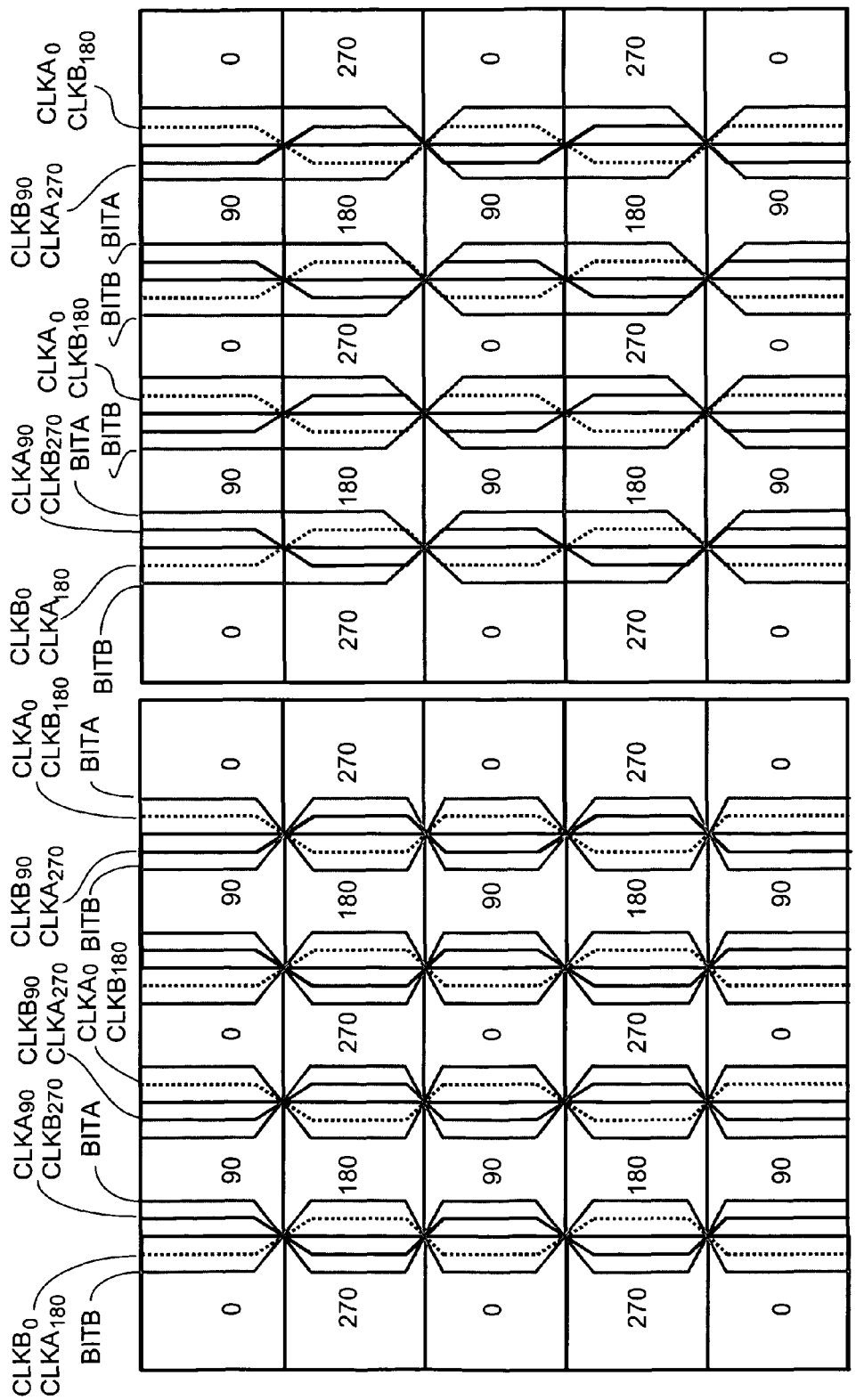

SYSTEM ARCHITECTURE DESIGN FOR TIME-OF-FLIGHT SYSTEM HAVING REDUCED DIFFERENTIAL PIXEL SIZE, AND TIME-OF-FLIGHT SYSTEMS SO DESIGNED

RELATIONS TO CO-PENDING APPLICATION

This is a continuation application from U.S. provisional patent application Ser. No. 61,133,647 filed on 30 Jun. 2008, entitled System Architecture Design for Time-of-Flight System Having Reduced Differential Pixel Size, and Time-of-Flight Systems So Designed, which application is assigned to Canesta, Inc. of Sunnyvale, Calif., assignee herein.

FIELD OF THE INVENTION

The present invention relates generally to time-of-flight (TOF) systems, and more particularly to designing improved architecture for such TOF systems to reduce size of the preferably differential pixels used in such systems, and TOF systems so designed.

BACKGROUND OF THE INVENTION

Modern time-of-flight (TOF) systems can ascertain depth distances Z to a target object by emitting modulated optical energy of a known phase, and examining phase-shift in the optical signal reflected from the target object, the phase-shift being detected by an array that includes pixel detectors and their dedicated electronics, collectively an array of "pixels". Exemplary such phase-type TOF systems are described in several U.S. patents assigned to Canesta, Inc. of Sunnyvale, Calif., assignee herein. These Canesta, Inc. patents include by way of example U.S. Pat. No. 6,515,740 "Methods for CMOS-Compatible Three-Dimensional Imaging Sensing Using Quantum Efficiency Modulation", U.S. Pat. No. 6,906,793 entitled Methods and Devices for Charge Management for Three Dimensional Sensing, U.S. Pat. No. 6,678,039 "Method and System to Enhance Dynamic Range Conversion Useable With CMOS Three-Dimensional Imaging", U.S. Pat. No. 6,587,186 "CMOS-Compatible Three-Dimensional Image Sensing Using Reduced Peak Energy", U.S. Pat. No. 6,580,496 "Systems for CMOS-Compatible Three-Dimensional Image Sensing Using Quantum Efficiency Modulation", U.S. Pat. No. 6,515,740 "Methods for CMOS-Compatible Three-Dimensional Image Sensing Using Quantum Efficiency Modulation", U.S. Pat. No. 6,580,496 'Systems for CMOS-Compatible Three-Dimensional Image Sensing Using Quantum Efficiency Modulation", U.S. Pat. No. 6,906,793 "Methods and Devices for Charge Management for Three-Dimensional Sensing", U.S. Pat. No. 7,352,454 "Methods and Devices for Improved Charge Management for Three-Dimensional and Color Sensing", and U.S. Pat. No. 7,464,351 "Method Enabling a Standard CMOS Fab to Produce an IC to Sense Three-Dimensional Information Using Augmented Rules Creating Mask Patterns Not Otherwise Expressible With Existing Fab Rules".

FIG. 1A is based upon the above-referenced patents, e.g. the Canesta '186 patent, and depicts an exemplary phase-type TOF system. In FIG. 1A, exemplary phase-shift TOF depth imaging system 100 may be fabricated on an IC 110 that includes a two-dimensional array 130 of pixel detectors 140, which pixel detectors for purposes of the present inversion are preferably differential in operation. Preferably each of the pixel detectors 140 has dedicated circuitry 150 for processing detection charge output by the associated detector, and the term "pixel" 155 shall refer to an individual differential pixel detector 130 and its dedicated electronics 150. Because each pixel 155 may include dedicated electronics, pixel size tends to be somewhat large, perhaps 50 μm×50 μm. IC 110 preferably also includes a microprocessor or microcontroller unit 160, memory 170 (which preferably includes random access memory or RAM and read-only memory or ROM), a high speed distributable clock 180, and various computing and input/output (I/O) circuitry 190. Among other functions, controller unit 160 may perform distance to object and object velocity calculations.

Under control of microprocessor 160, optical energy source 120 is periodically energized by an exciter 115, and emits modulated optical energy toward an object target 20. Emitter 120 preferably is at least one LED or laser diode(s) emitting relatively low peak power (e.g., perhaps 1 W) periodic waveform, producing optical energy emissions of known frequency (perhaps a few dozen MHz) for a time period known as the shutter time (perhaps 10 ms). Typically emitter 120 operates in the near IR, with a wavelength of perhaps 800 nm. A lens 125 is commonly used to focus the emitted optical energy.

Some of the emitted optical energy (denoted $S_{out}$) will be reflected (denoted $S_{in}$) off the surface of target object 20. This reflected optical energy $S_{in}$ will pass through an aperture field stop and lens, collectively 135, and will fall upon two-dimensional array 130 of pixel or photodetectors 140. When reflected optical energy $S_{in}$ impinges upon photodetectors 140 in array 130, photons striking the photodetectors release photocharges that are converted into tiny amounts of detection current. For ease of explanation, incoming optical energy may be modeled as $S_{in}=A\cdot\cos(\omega\cdot t+\theta)$, where A is a brightness or intensity coefficient, w·t represents the periodic modulation frequency, and θ is phase shift. As distance Z changes, phase shift θ changes, and FIGS. 1B and 1C depict a phase shift θ between emitted and detected signals. The phase shift θ data can be processed to yield desired Z depth information. Within array 130, pixel detection current can be integrated to accumulate a meaningful detection signal, used to form a depth image. In this fashion, TOF system 100 can capture and provide Z depth information at each pixel detector 140 in sensor array 130 for each frame of acquired data.

Signal detection within phase-type TOF systems such as system 100 is described more fully later herein with respect to FIG. 2B, but in brief, pixel detection information is captured at at least two discrete phases, preferably 0° and 90°, and is processed to yield Z data.

System 100 yields a phase shift θ at distance Z due to time-of-flight given by:

$$\theta=2\cdot\omega\cdot Z/C=2\cdot(2\cdot\pi\cdot f)\cdot Z/C \quad (1)$$

where C is the speed of light, 300,000 Km/sec. From equation (1) above it follows that distance Z is given by:

$$Z=\theta\cdot C/2\cdot\omega=\theta\cdot C/(2\cdot 2\cdot f\cdot\pi) \quad (2)$$

And when θ=2·π, the aliasing interval range ($Z_{AIR}$) associated with modulation frequency f is given as:

$$Z_{AIR}=C/(2\cdot f) \quad (3)$$

FIG. 2 is taken from U.S. Pat. No. 6,580,496 "Systems for CMOS-Compatible Three-Dimensional Image Sensing Using Quantum Efficiency Modulation and from U.S. Pat. No. 7,464,351 and is useful in understanding the concept of quantum efficiency modulation. FIG. 2 is not intended to be a component-by-component schematic, but rather a tool or metaphor to explain the underlying concepts. In simplified form, FIG. 2 depicts a quantum efficiency (QE) modulated pair of pixels 155-1, 155-N in array 130. The depletion width W of a photodiode 140 (or D) can be modulated using clock signals to vary the reverse bias across the photodiodes, preferably 180° out of phase. Thus, when diode D is biased to be sensitive, diode D' is not, and vice versa. In this fashion, photodiode quantum efficiency (QE) is varied, which improves detection sensitivity. QE modulation techniques advantageously can accumulate detected signal charge, and are preferred over methods that attempt to directly measure high frequency, small magnitude detection photocurrent-generated signals. While the simplified representation of FIG. 2 suggests a one-terminal device, in reality the detectors are two-terminal devices (e.g., an output signal and a clock signal), and in preferred embodiments in which differential detectors are employed, four-terminal devices. Various quantum efficiency embodiments including fixed-phase and variable-phase are described in the cited patents. An advantage of quantum efficiency modulation is that phase and target object brightness information can be determined directly from the pixel detectors with relatively minimal additional circuitry.

But even employing quantum efficiency modulation, FIG. 2 suggests that providing every pixel with analog and digital components adds to the complexity of dedicated electronics 150, and thus to the IC chip area required to implement pixels 145. For example, in FIG. 2, each pixel requires analog and digital components including a differential amplifier, a capacitor, a phase delay unit, etc. Generally memory 170 includes software that can be executed by a processor, perhaps processor 160, to implement and control signals used in quantum efficiency modulation detecting.

Understandably the magnitude of the optical energy signals to be detected is small, and differential detection techniques are preferred to reduce the mal-effects of noise. FIG. 3A is taken from U.S. Pat. No. 7,464,351 "Method and System to Differentially Enhance Sensor Dynamic Range Using Enhanced Common Mode Reset". FIG. 3A depicts an exemplary differential pixel 155, comprising a pixel detector PD and associated circuitry is shown in which during reset operation capacitors acquire exactly the same charge in each half of the pixel configuration. By adding exactly the same charge to each half of the configuration, common mode contribution is essentially removed and differential mode contribution is preserved. Such an approach offers several advantages. For example, extra resets do not affect the system operation, and the pixel detector may be reset even if it is not discharged. Further, capacitor or component mismatch has substantially no effect on the accuracy of the reset. In addition, it can be shown that common mode reset (CMR) generates no KT/C noise in the differential domain from capacitors $C_{DA}$ and $C_{DB}$. The only resulting KT/C contribution appears in common mode where it is unimportant.

As analyzed and described in the '351 patent, reset operation for the embodiment of FIG. 3A advantageously centers the common mode about potential $V_{ref}$. For ease of illustration, FIG. 3A does not depict $Q_A$, which is the sum of the charge on the top plate of capacitors $C_A$ and $C_{DA}$, or $Q_B$, which is the sum of the charge on the top plate of capacitors $C_B$ and $C_{DB}$. In operation, the configuration of FIG. 3A preserves the differential quantity $Q_A-Q_B$ during the common mode reset operation, although the common mode quantity, $(Q_A+Q_B)/2$, is changed at each reset. What occurs is that after a reset, the quantity $(Q_A+Q_B)/2$ is moved closer to some constant $Q_{reset0}$. Thus in contrast to other reset approaches, additional resets substantially preserve the differential charge have no adverse impact in FIG. 3A as they simply move the operating point for $(Q_A+Q_B)/2$ even closer to $Q_{reset0}$. Advantageously, the configuration of FIG. 3A does not require close matching of component values for capacitors $C_A$, $C_B$, $C_{DA}$, and $C_{DB}$, non-linearity of the capacitors does not affect performance.

In short, reset operation of the embodiment of FIG. 3A has the desired effect of centering the common mode about potential $V_{ref}$. Relevant waveforms for FIG. 3A are shown in FIG. 3B and FIG. 3C. As a consequence, a reset can be applied without consideration of over-saturating or under-saturating the common mode for the pixel configuration. Thus in normal operation, reset can occur as often as desired without concern as to ill effects resulting from over or under saturation of the common mode.

Transistors $T_{disA}$ and $T_{disB}$ can be used as global shutters, thereby improving resilience to ambient light by stopping the effects of all light impinging on the differential pixel when the shutter is turned off. When $T_{disA}$ and $T_{disB}$ are off, capacitors $C_a$ and $C_b$ are decoupled from photodetectors $PD_{DA}$ and $PD_{DB}$ and therefore stop integrating the signal from $PD_{DA}$ and $PD_{DB}$. If the output of the pixel is chosen to be top plate of capacitors $C_A$ and $C_B$ then the output of the pixel will be frozen after $T_{disA}$ and $T_{disB}$ are turned-off, thereby providing the function of a global shutter.

FIG. 4A depicts an embodiment using additional common mode reset circuitry 200 that improves differential loss while preserving relatively low KT/C noise characteristics. Within circuitry 200, operational amplifier 210 functions to remove differential detector signal charge from nodes $O_A$, $O_B$ and to store the removed charge in an integration capacitor. With this functionality, the embodiment of FIG. 4A preserves the stored removed charge without substantial loss due to subsequent common mode reset cycles.

In practice, at least a substantial fraction (e.g., $\geq 50\%$) of the stored charge is removed for isolated storage on each so-called dump cycle. It will be appreciated that the system could function with less than 50% stored charge removal per cycle, however overall more differential charge will be lost during common mode reset operations. The result from saving at least a substantial fraction of the differential charge is improved dynamic range, improved retention of the desired differential detector signal, and improved common mode rejection. Components shown in FIG. 4A other than differential detector or pixel 140 may be designated as electronics 160, preferably dedicated to each pixel 155, and CMOS-implemented on the common IC 110. While improved performance is achieved, it is seen that the area requirements for pixel 155 increase due to the additional circuitry.

During an integration period T, operation of the embodiment exemplified by FIG. 4A involves a number n of common mode reset operations, and a number x of dumps (transfers-out) of the differential charge from capacitors $C_A$, $C_B$ associated with each differential pixel detector into an active integration capacitor C220. Once dumped, the differential charge is stored in capacitor C220 and is not affected by subsequent common mode resets. More than one integration capacitor may be used, and within an integration period T, the number of dumps x may be less than or equal to or even greater than n.

During common mode reset operation, the differential detector signal charge is first read transferred into the integration capacitor C220 by turning-on dump transistors $T_{dA}$, $T_{dA'}$. So doing dumps charge from capacitor $C_A$ node $O_A$ and from capacitor $C_B$ node $O_B$ respectively into the non-inverting and inverting inputs of operational amplifier 210. Shutter transistors $T_{shutA}$ and $T_{shutB}$ remain open, which allows even the differential detector charge to be transferred. Subsequent common mode resets will have no effect on this safely stored-away differential detector and capacitor $C_A$ and $C_B$ charge.

Next, shutter transistors $T_{shutA}$ and $T_{shutB}$ and dump transistors $T_{dA}$, $T_{dA'}$ are opened, and common mode reset is performed.

The embodiment of FIG. 4A limits charge loss to about 0.5%, e.g., about 99.5% of charge is retained. Furthermore, the 0.5% or so charge loss that occurs will be substantially independent of the number n of common mode rejection cycles, with no degradation to KT/C noise characteristics or removal of common mode by common mode reset.

Amplifier 210 provides a single-ended output signal (AMP OUT) that could be used to directly drive a bitline (BITLINE B) without use of a source follower such as $T_{fB}$ in FIG. 4A. Nonlinear effects of the source follower for bitline A are small because the voltage magnitude will be close to Vref3. Also depending upon how bitline readout is implemented, BITLINE A may be coupled directly to Vref3 instead of via a source follower for reasons of simplicity. Inclusion of a source follower introduces nonlinear effects, especially in the presence of a large differential signal when source followers $T_{fA}$ and $T_{fB}$ would be operating at different gate input voltages.

Components in sub-system 230 are optional but advantageously allow closed-loop gain of operational amplifier 210 to be varied by adding C240 to increase effective integration capacitance. Integration capacitance can be increased by judiciously enabling transistor switches in the feedback loop via control signals VGA1, VGA2, VGA3 and VGA4. This flexibility can advantageously vary amplifier 210 closed loop gain, and can be used to improve distance measurement resolution δZ, while still avoiding amplifier saturation.

At the end of an integration period, the total accumulated charge in integration capacitor 220 (perhaps 40 fF) may be read-out in several ways. When the READ signal to the gate of transistor $T_{rA}$ is high (for the configuration shown), the signal present at the inverting input of operational amplifier 210 will be read-out to BITLINE A. Preferably simultaneously, the READ signal also turns-on transistor $T_{rB}$ such that BITLINE B reads-out the AMP OUT signal. What results is a differential signal across BITLINE A and BITLINE B that represents the correct voltage value stored on integration capacitor C220.

An alternate read-out method will now be described. Consider now the signal at the non-inverting input of operational amplifier 210. A high signal $C_{Vref3}$ turns-on transistor $T_{ref3}$, which couples a known reference voltage $V_{REF3}$ to the non-inverting input of operational amplifier 210. As a result, a high READ signal to transistor $T_{rB}$ reads-out the signal on BITLINE B. If necessary, BITLINE A may be read-out simultaneously to reduce the effects of noise on $V_{REF3}$. The result is achieved by creating a differential value at the input of operational amplifier 210, wherein one of the differential values is $V_{REF3}$.

It will be appreciated that some mismatch may exist between the values of storage capacitors $C_A$, $C_B$ as well as between node parasitic capacitance, which mismatches can affect the final signal value of the first-described read-out method. It is understood that there will be parasitic capacitance at the non-inverting input of operational amplifier 210. Relative to a capacitor reset value of Vref, the AMP. The charge (with respect to a capacitor reset value of Vref) on this parasitic capacitance is substantially eliminated when the node is coupled to $V_{ref3}$. This is what occurs in the second read-out method, but unfortunately a charge error is created whenever the initial amplifier input was not precisely $V_{ref3}$. However effects of mismatch using the first read-out method and effects of charge error using the second read-out method can both be reduced by first bringing the voltage levels at both operational amplifier 210 inputs substantially to the initial reset value. The desired result can be accomplished by performing a series of common mode reset and charge dump operations before beginning the read-out sequence.

Alternately by reading from Bitline A a single ended value (denoted SBA), the error resulting from mismatch between Vref and voltages on the inputs to operational amplifier 210 can be compensated for mathematically. This is because for both read-out methods, there is a mathematical formula between the error and SBA. This mathematical formula is a function of SBA and integration capacitor C220, and either the capacitance mismatches (for the first read-out method) or the non-inverting operational amplifier positive terminal capacitance (for the second read-out method). Note that for the second read-out method the value SBA must be read-out before $V_{ref3}$ is connected.

A combination of both read-out methods can be used, as follows. First the voltage on the two operational amplifier inputs is brought close to the reset voltage $V_{ref3}$. Then SBA is read-out using either read-out method, and the remaining error is mathematically calibrated out. For economy of implementation, it is preferable to acquire SBA with relatively low accuracy. Thus in practice, SBA is read-out before the voltage on the operational amplifier inputs is brought close to reference voltage $V_{ref3}$ via repeated common mode reset dump operations.

Before this series of common mode reset dump operations, magnitude of SBA relative to the reset voltage $V_{ref3}$ will be fairly large, perhaps in the tens or hundreds of mV range. But after the series of common mode reset dump operations, this residual SBA voltage will be on the order of perhaps a few mV. Furthermore, this residual voltage will be a known fraction of the original SBA voltage before the series of common mode dump operations. Because this fraction is known a priori, by quantizing the larger quantity (magnitude of SBA before the reset operations), the smaller quantity (magnitude of SBA after the reset operations) can be known more accurately. The fraction can be determined empirically, or can be modeled taking into account relative values of $C_A$, $C_B$, and parasitic capacitance present at the non-inverting input of operational amplifier 210.

The addition of transistor switches connected to the DUMP B signal allows the differential detector system shown in FIG. 4A to function symmetrically with respect to "A" and "B" detector components. As a result, at some times the "A" and "B" components of differential detector 150 will be coupled to the non-inverting input and inverting inputs, respectively, of operational amplifier 210, and at other times the capacitor couplings will be reversed. Within an integration period T, there may be several integration time slices defined. After each sub-integration time slice, one might decide to carry out a dump operation, a common mode reset operation or both. After each integration time slice, the roles of "A" and "B" within the differential detector may be alternated. This alternation can result from interchanging the clock signals for "A" and for "B", or changing by 180° the phase of optical energy emitted by 120 (see FIG. 1A), which has the same effect. With such alteration, a differential signals is produced at the output of detector 155 that, to the first order, is the inverse of the differential signal at the previous sub-integration time slice.

Note that the DUMP B-related transistor switches couple operational amplifier 210 with the non-inverting and inverting input terminals switched with respect to DUMP A. As a result, the signal that accumulates on integration capacitor C220 accumulates in additive fashion. This feature advantageously substantially reduces many errors associated with offsets and the like, and reduces reliance upon 0°, 180° cancellation in different detection signal captures. This improvement follows because both 0° and 180° phases are used within a common capture (e.g., at a close time interval perhaps on the order of a mS or so) to cancel errors. Further, additional functionality results from the presence of operational amplifier 210, which may be used for multiple functions: to enhance common mode reset as noted above, and for pixel detector analog-to-digital conversation using techniques well known in the art. Other secondary uses of the operational amplifier can include dynamic range enhancement, 0°, 180° cancellation, 0°, 90° capture, and so on.

Some exemplary parameters for the embodiment of FIG. 4A not stated above will now be given. Capacitor C240 is nominally about half the value of integration capacitor 240, e.g., about 20 fF, where storage capacitors $C_A$ and $C_B$ are each about 60 fF. Exemplary fabrication data for transistors $T_{fA}$, $T_{fB}$ are about 0.5μ/0.356μ, transistors $T_{rA}$, $T_{rB}$ are about 1.5μ/0.6μ, transistors $T_{refA}$, $T_{refB}$, $T_{resetA}$, $T_{resetB}$ are about 0.42μ/0.6μ, transistors $T_{shutA}$, $T_{shutB}$ are about 0.42μ/0.6μ, and the four transistors associated with capacitors C220, C240 are each about 2μ/0.6μ.

FIG. 4B depicts various oscilloscope amplitude versus time traces for AMP IN, AMP OUT and DUMP A waveforms for a received detector light phase such that the AMP OUT signal increases with time. The integration period T in FIG. 4B is approximately 18 ms. The uppermost waveform is the AMP A or BITLINE B signal, which represents the accumulated differential between charge on capacitor $C_A$ and capacitor $C_B$ during the integration time T. It is seen that the AMP OUT signal approximates a stair-step waveform that increases every time DUMP A is turned on. The resetting of AMP IN and AMP OUT to the reference voltage preceding each reset occurring at events $\phi_F$, is shown superimposed on the DUMP A reset signals. It is understood that when $\phi_F$ is active, high in this example, active reset signals are also present at $\phi_{SW}$, $\phi_{norm}$, and so forth. In FIG. 4B, waveforms just preceding events $\phi_F$ are read actions, for which the non-inverting operational amplifier input is coupled to Vref3. For ease of illustration, magnitude of Vref3 is intentionally shown as being different than magnitude of the reset voltage.

FIG. 5A is taken by U.S. Pat. No. 7,321,111 to assignee Canesta, Inc. and depicts an embodiment of a differential pixel with improved differential dynamic range and signal/noise ratio. This embodiment provides common mode reset with restoration of common mode potential at the input of operational amplifier 210. Detector 140 is depicted as receiving a number of VBIAS and clock signals, but more or fewer such bias and clock signals can instead be used. Additional description regarding differential photodetectors may be found in U.S. Pat. No. 6,906,793 (2005) Methods and Devices for Charge Management for Three-Dimensional Sensing, assigned to Canesta, Inc.

The embodiment of FIG. 5A seeks to avoid saturating even with relatively large amplitude differential signals, while also enhancing signal/noise ratio for the detection signal path. Saturation can be avoided by adding a fixed compensating offset (ΔV) to the differential signal voltage on capacitor $C_{DSC}$ whenever magnitude of the differential signal exceeds a predetermined maximum or minimum value. (If desired, the fixed compensating offset signal could of course be ΔQ, where Q is charge.). In FIG. 5A, circuitry 300 is used to implement the insertion, as required, of the fixed compensating offset (ΔV) into differential signal capacitor $C_{DSC}$ to avoid differential pixel saturation, even from relatively large amplitude differential signals. As such, offset ΔV is negative if the voltage on $C_{DSC}$ has become too positive, and the offset ΔV is positive if the voltage on $C_{DSC}$ has become too negative. In some embodiments, as indicated by FIG. 5B, the accumulated charge voltage on the differential signal capacitor is checked synchronously, at which time ΔV is added, if needed. A count is kept of the number (N) of ΔV offsets that had to be added, and effective differential signal capacitor voltage is actual output voltage across the capacitor (Vo)+N·ΔV.

In other embodiments, as exemplified by FIG. 5C, reset of the integration capacitor voltage is asynchronous, and occurs whenever the voltage exceeds a predetermined maximum or minimum threshold. Again a count of the number (N) of resets is kept, and effective differential signal capacitor voltage is Vo+N·ΔV. These embodiments preserve the desired differential signal and prevent saturation of the differential pixel even when the differential signal is large in amplitude. Saturation due to common mode signal is prevented, preferably using embodiments described in U.S. Pat. No. 7,176,438 assigned to Canesta, Inc.

Other embodiments of U.S. Pat. No. 6,321,111 describe how to dynamically vary the gain $A_G$ of pixel amplifier 270 to enhance detection signal/noise ratio by using a highest possible gain that still avoids saturation of the pixel electronics. A high amplifier gain ($A_G$) advantageously reduces effective noise contribution downstream in the signal path by $1/A_G$. Gain of each such amplifier is variably controlled to adjust $A_G$ individually for each pixel as a function of its present signal value.

Within the array of differential pixels, each amplifier is first operated at maximum $A_G$, and integration capacitor values are readout and stored in a row buffer. $A_G$ for each amplifier in the row is then incrementally decreased, and the row buffer is updated only for those amplifiers whose associated integration capacitor is not presently saturated. The above process is repeated until the value in the row buffer corresponds to the highest non-saturating gain for each amplifier associated with the row. The row buffer also records the value of the highest non-saturating gain for each amplifier associated with the row. At this juncture row buffer is readout, and the process is repeated for the next row in the array, and so on continuously. In this fashion amplifier values of $A_G$ are individually maximized, commensurate with avoiding overload or saturation of components downstream in the signal path. The desired result is enhanced signal/noise ratio. Alternative embodiments can, of course, increment rather than decrement amplifier gain, and cause the row buffer to latch the non-saturated gain value for each amplifier associated with a row.

In FIG. 5A, when accommodating for large differential dynamic range, let the differential charge first be converted to a single ended value and be collected in a differential signal capacitor $C_{DSC}$. It is understood that the relationship between the detected differential photocurrent i, the capacitor $C_{DSC}$, and the resultant voltage is given by $i = C_{DSC} \delta V/\delta t$.

As shown in FIG. 5B, at periodic intervals, e.g., at t1, t2, t3, . . . , magnitude of the charge voltage developed on capacitor $C_{DSC}$ is checked synchronously. If at the moment of check the voltage on $C_{DSC}$ exceeds a threshold, $V_{high}$ or $V_{low}$, then a compensating fixed amount of charge (denoted ΔV) is added to capacitor $C_{DSC}$ as a compensating offset. Thus if the accumulated voltage on $C_{DSC}$ becomes too positive, e.g., $V > V_{high}$, then an offset of −ΔV is added to capacitor $C_{DSC}$, and if V becomes to negative, $V < V_{low}$, then an offset of +ΔV is added to capacitor $C_{DSC}$.

For example, in FIG. 5B at time t1, $V > V_{high}$ and a negative offset ΔV is added to the capacitor voltage. At time t2, magnitude of the capacitor voltage does not exceed $V_{high}$ or $V_{low}$ and no offset is added. However at time t3, the voltage is again too high and a negative offset ΔV is again introduced, and so on. The number (N) of resets is counted and at a given time, the effective voltage ($V_{effective}$), had no resetting occurred, is equal to $V_{out}+n\Delta V$. In this example, there were three resets (n=3), the $V_{effective}=V_{out}+N\Delta V$, $=V_{out}+3\Delta V$. A diagram similar to FIG. 5B could be drawn for capacitor $C_{DSC}$ acquiring a negative charge, in which case a positive offset $+\Delta V$ would be added whenever the capacitor voltage goes below $V_{low}$. If the effective capacitor saturation voltage is very high, an offset larger than $V_{high}$ but preferably not larger than ($V_{high}-V_{low}$) may be used to reduce the number of offsets N.

FIG. 5C depicts an alternative embodiment, again using the example of a capacitor $C_{DSC}$ acquiring a positive charge, in which the voltage on $C_{DSC}$ is reset asynchronously, whenever $V > V_{high}$. In this example, each reset adds $-\Delta V$ to the capacitor voltage, which returns the capacitor voltage to $V_{low}$. Again the number N of resets is counted, and the effective capacitor voltage is given by $V_{effective}=V_{out}+N\Delta V$, or since n=4 in this example, $V_{effective}=V_{out}+4\Delta V$. If the effective capacitor saturation voltage is very high, a negative reset offset, preferably not lower than $V_{low}$ (the low saturation voltage) may be used to reduce the number of resets N. Again a similar diagram may be drawn for the case of a capacitor $C_{DSC}$ accumulating a negative voltage.

The choice of implementing synchronous or asynchronous reset depends upon many factors. Generally, an asynchronous reset is more complex as each pixel must constantly monitor its differential signal capacitor voltage, and self generate control signals required to adjust the $C_{DSC}$ voltage. Further, these operations must be performed accurately in the presence of noise, as the other pixels are integrating and hence the modulation clocks are running. Further, if the reset count is not accumulated inside the pixel, the occurrence of resets may need to be communicated asynchronously, a difficult task when all pixels simultaneously reset. On the other hand a synchronous implementation requires more frequent resets as the pixels must be reset well before they saturate. Further, it must be ensured that the pixels have sufficient remaining margin such that they do not saturate before the next $C_{DSC}$ voltage check, which may not occur for a while. Also in synchronous implementations, each $\Delta V$ reset adjustment must be smaller as the $C_{DSC}$ voltage may be relatively far from saturation.

It was seen from equation (3) that changes in Z produce change in phase shift $\theta$. However eventually the phase shift begins to repeat, e.g., $\theta=\theta+2\cdot\pi$, etc., and distance Z is known modulo $2\cdot\pi\cdot C/2\cdot\omega)=C/2\cdot f$, where f is the modulation frequency. As such, an inherent ambiguity can exist between detected values of phase shift $\theta$ and distance Z in that if system 100 reports a distance $Z_1$, in reality the actual distance may be any of $Z_N=Z_1+N\cdot C/2f$, where N is an integer. The nature of this ambiguity may be better understood with reference to FIGS. 6A and 6B. In practice, multi-frequency methods are employed to disambiguate or dealias the phase shift data.

FIG. 6A is a mapping of detected phase $\theta$ versus distance Z for system 100. Assume that system 100 determines a phase angle $\theta'$ for target object 20, where this phase information was acquired with a modulation frequency $f_1$ of say 50 MHz. As shown by FIG. 6A, there are several distances, e.g., $z_1, z_2, z_4, z_5$, etc. that could be represented by this particular phase angle ... but which is the correct distance? In FIG. 6A, $Z_{AIR1}$ represents the Z distance aliasing interval range associated with z data acquired at frequency $f_1$, and is the distance from $z_1$ to $z_2$, or $z_2$ to $z_4$, or $z_4$ to $z_5$, etc. These various $z_1, z_2, z_4, z_5$, distances are ambiguous and require disambiguation or dealiasing to identify the correct distance value.

It is desired to dealias the z data by increasing magnitude of the aliasing interval range $Z_{AIR1}$. One prior art approach does this by increasing the ratio C/2f, which is to say, by decreasing the modulation frequency f, see equation (3). FIG. 6A also shows, in bold line, phase data acquired for a lower modulation frequency $f_2$. In FIG. 6A, $f_2$ is perhaps 20 MHz, in that the slope d$\theta$/dz for the $f_2$ waveform is less than about half the slope for the $f_1$ waveform, where the slope d$\theta$/dz is proportional to modulation frequency $f_m$. FIG. 6B is a polar representation in which a vector, depicted as a line rotating counter-clockwise, rotates with velocity $\omega$=d$\theta$/dt=$2\pi$f. In prior art system 100, data is captured from pixel detectors at at least two discrete phases, e.g., 0° and 180°.

Thus in FIG. 6A, when the lower modulation frequency $f_2$ is employed, the candidate distance values represented by phase $\theta'$ are $z_3$, $z_6$, etc. As seen in FIG. 6A, the aliasing interval range $Z_{AIR2}$ has advantageously increased from a short range $Z_{AIR1}$ (associated with faster modulation frequency $f_1$) to a greater range $Z_{AIR2}$. The ratio of the aliasing interval range increase will be the ratio $f_2/f_1$. But acquiring phase data with lower modulation frequency $f_2$ yields a Z value with less precision or resolution than if acquired with higher modulation frequency $f_1$. This imprecision occurs because the slope of the curve for frequency $f_2$ is about half the slope for modulation frequency $f_1$. Thus errors in the measurement of phase acquired at $f_2$ translate to greater errors in Z than errors in phase acquired at $f_1$. For the same signal/noise ratio, errors in phases acquired at f1 and at f2 will be the same, but the corresponding uncertainty errors in Z use phase acquired at the lower $f_2$ modulation frequency will be about twice as large for the representation of FIG. 6A. Thus, all things being equal, lowering the modulation frequency undesirably results in lower resolution (greater uncertainty) in accurately determining Z.

Thus while increasing the aliasing range interval is desired, doing so by decreasing the modulation frequency f is not desirable. This modulation frequency decrease approach to dealiasing is wasteful since lower modulation frequency means lower pixel sensor 140 accuracy per watt of illumination power from emitter 120 (see FIG. 1A). For example, a reduction of modulation frequency by a factor of 2.5, say from f=50 MHz to f=20 MHz, will advantageously increase the aliasing interval by the same factor, e.g., from 3 m to 7.5 m, but the penalty is a substantial (2.5)·(2.5)=6.25× increase in operating power to achieve similar uncertainty performance, assuming effects of ambient sunlight can be ignored.

Unfortunately, implementing dealiasing with prior art TOF systems 100 tends to further increase size of pixels 155, which is undesirable in that smaller rather than larger pixel sizes are desired. For a given size IC chip 110, it is understood that if individual pixels 155 could be reduced in size, array 130 could include a greater number of pixels with corresponding enhanced resolution. Alternatively, if the area of array 130 were reduced due to smaller sized pixels, then the area of IC 110 could be reduced, which would tend to reduce production costs and would tend to enhance yield.

From the various descriptions of FIGS. 1A-6B, it will be appreciated that implementing a feature rich time-of-flight system with high performance pixels, single-ended or preferably differential, requires providing analog and/or digital circuitry or functions on a per-pixel basis. So doing, however, increases the area on IC 110. FIG. 7A shows a portion of IC 110 and depicts the nature of the problem: individual pixels 155, each comprising a detector 140 and dedicated electronics 150, are too large, typically perhaps 50 µm×50 µm. This large pixel size results from the inclusion of numerous analog and/or digital circuitry or functions, as have been described, to implement pixel functionality and to improve pixel detection characteristics. What is needed is a configuration more like FIG. 7B, wherein individual detectors 140 may remain the same size, but the chip size needed for their dedicated electronics 150' is reduced by intelligently removing from pixels 155 various common analog and/or digital circuits or functionality. The present invention provides such an architecture, which results in a small pixel size. As a result, more pixels can be accommodated by a given array area size on an IC chip, or for the same pixel density (numbers of rows× columns) as a prior art configuration, the array area size can be reduced. Preferably the resultant architecture not only provides smaller area pixels but also preserves (if not enhances) rich features desired in TOF systems, including dealiasing, manipulating RGB-Z data, including segmentation, up-sampling, and background substitution.

SUMMARY OF THE INVENTION

Embodiments of the present invention provide methods to produce a high performance, feature rich TOF system, phase-based or otherwise using small TOF pixels that may detect single-ended or preferably differentially. The array region of IC chip area required to fabricate or implement the pixels is reduced by intelligently off-loading or removing from within the pixel certain components and/or functionality. Preferably the components used to implement the off-array functionality can service multiple pixels, preferably simultaneously. As used herein, the term "pixel" denotes an active optical energy detecting component in an array and such dedicated circuitry as is formed within the available pixel array area for that detecting component.

Preferably the analog output signals acquired during a single TOF system acquisition or capture period from the pixel detectors are digitized using circuitry fabricated within the IC chip area containing the pixel array. The digitized signals may be processed and the resultant digital data exported for further processing by other circuitry fabricated on a portion of the IC chip area other than the pixel array area.

The overall result is that a feature rich TOF system can be implemented with pixels that require smaller chip area for fabrication. This in turn can enable higher resolution pixel arrays. In addition, the optical system for the pixels can also be reduced in size (diameter and thickness), as the pixels become smaller.

Other features and advantages of the invention will appear from the following description in which the preferred embodiments have been sets forth in detail, in conjunction with the accompany drawings.

BRIEF DESCRIPTION OF THE DRAWINGS

FIG. 17B depicts alternate row bitline swapping, according to an embodiment of the present invention; and FIG. 17C depicts bitline swapping every two rows to fully balance differential signals, according to an embodiment of the present invention.

DETAILED DESCRIPTION OF THE PREFERRED EMBODIMENTS

Figure 1A:
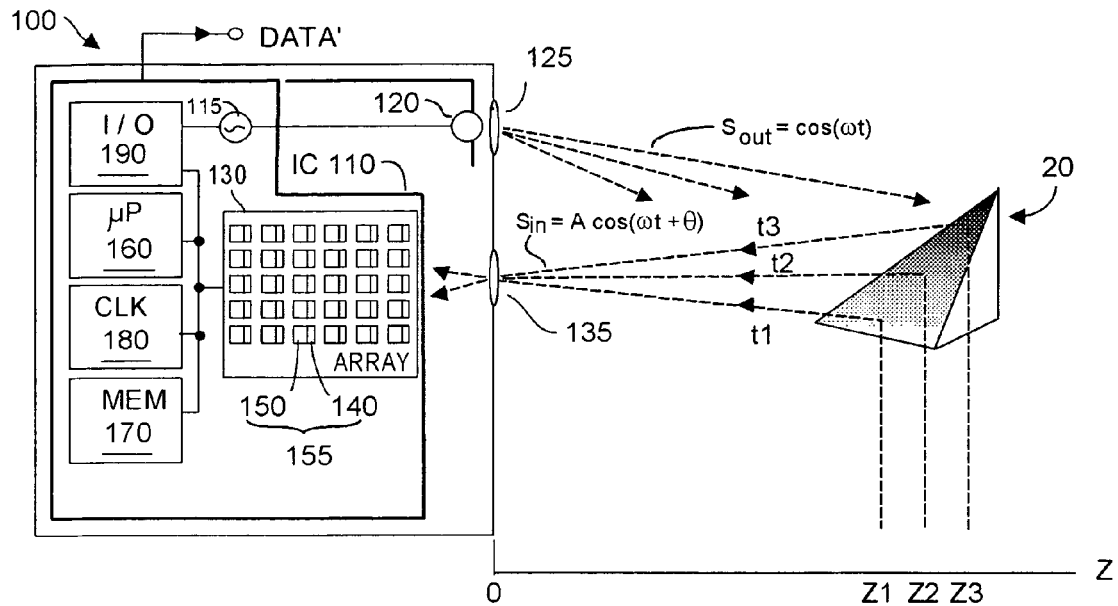
FIG. 1A is a block diagram depicting a Canesta, Inc. phase-type time-of-flight three-dimensional imaging system, according to the prior art.
Figure 1B:
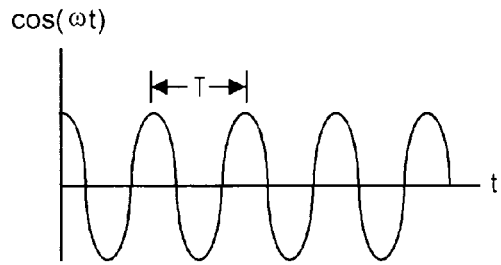
FIGS. 1B and 1C depict emitted and reflected optical energy waveforms associated with the imaging system of FIG. 1A, according to the prior art.
Figure 1C:
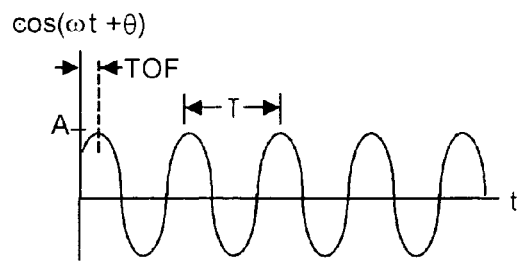
Figure 2:
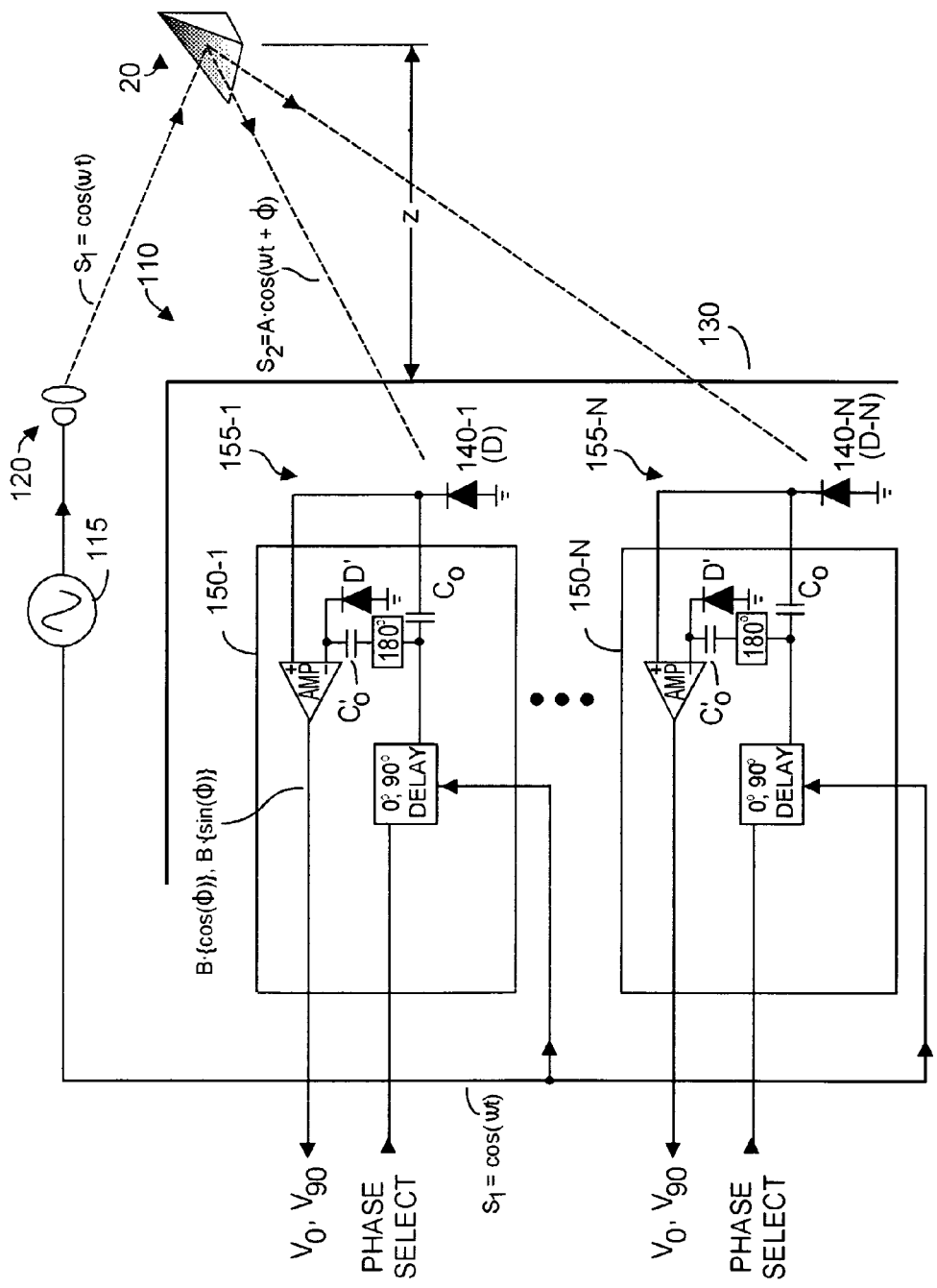
FIG. 2 is an exemplary diagram useful to understanding the concept of quantum efficiency modulation, as described in U.S. Pat. Nos. 6,580,496 and 7,464,351 to Canesta, Inc.
Figure 3A:
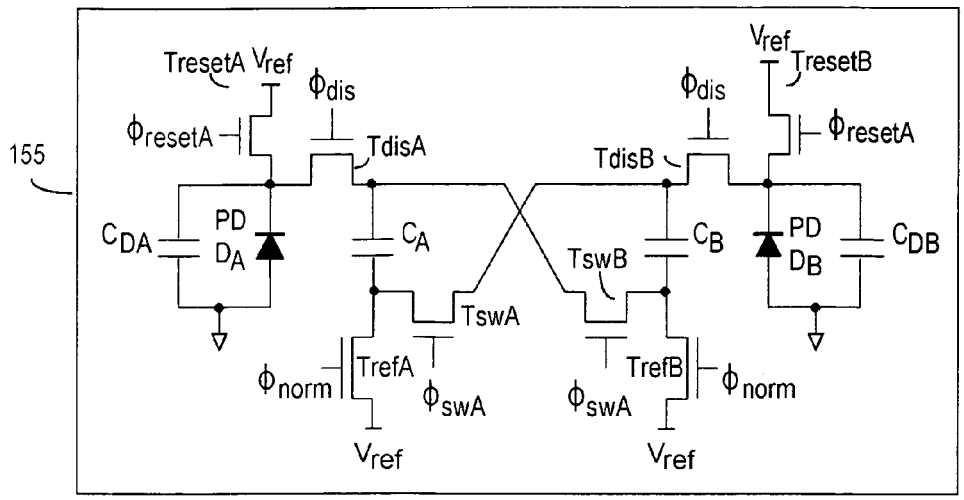
FIG. 3A depicts a common mode resettable differential pixel detector, according to an embodiment of embodiment of U.S. Pat. No. 6,919,549 and from U.S. Pat. No. 7,507,947.
Figure 3B:
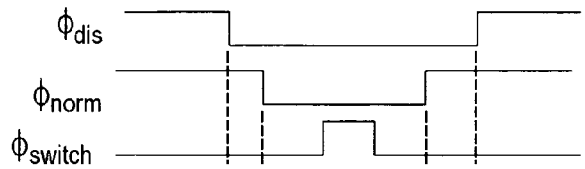
FIG. 3B depicts control waveforms present in the detector of FIG. 3A, according to the prior art.
Figure 3C:
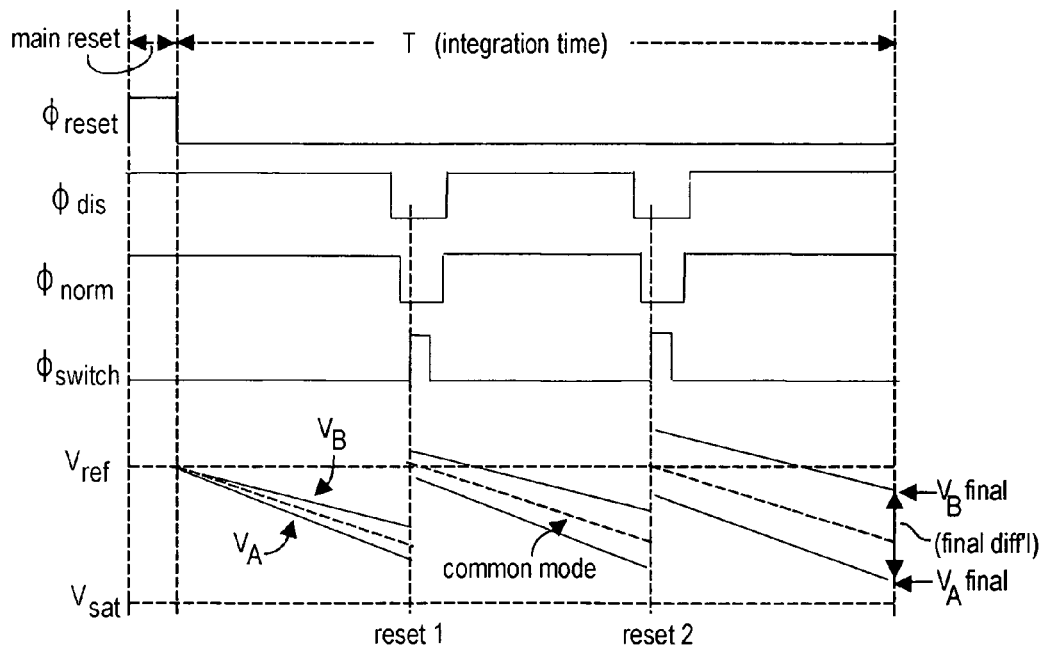
FIG. 3C depicts waveforms present in the detector of FIG. 3A over a two reset sequence, according to an embodiment of embodiment of U.S. Pat. No. 6,919,549.
Figure 4A:
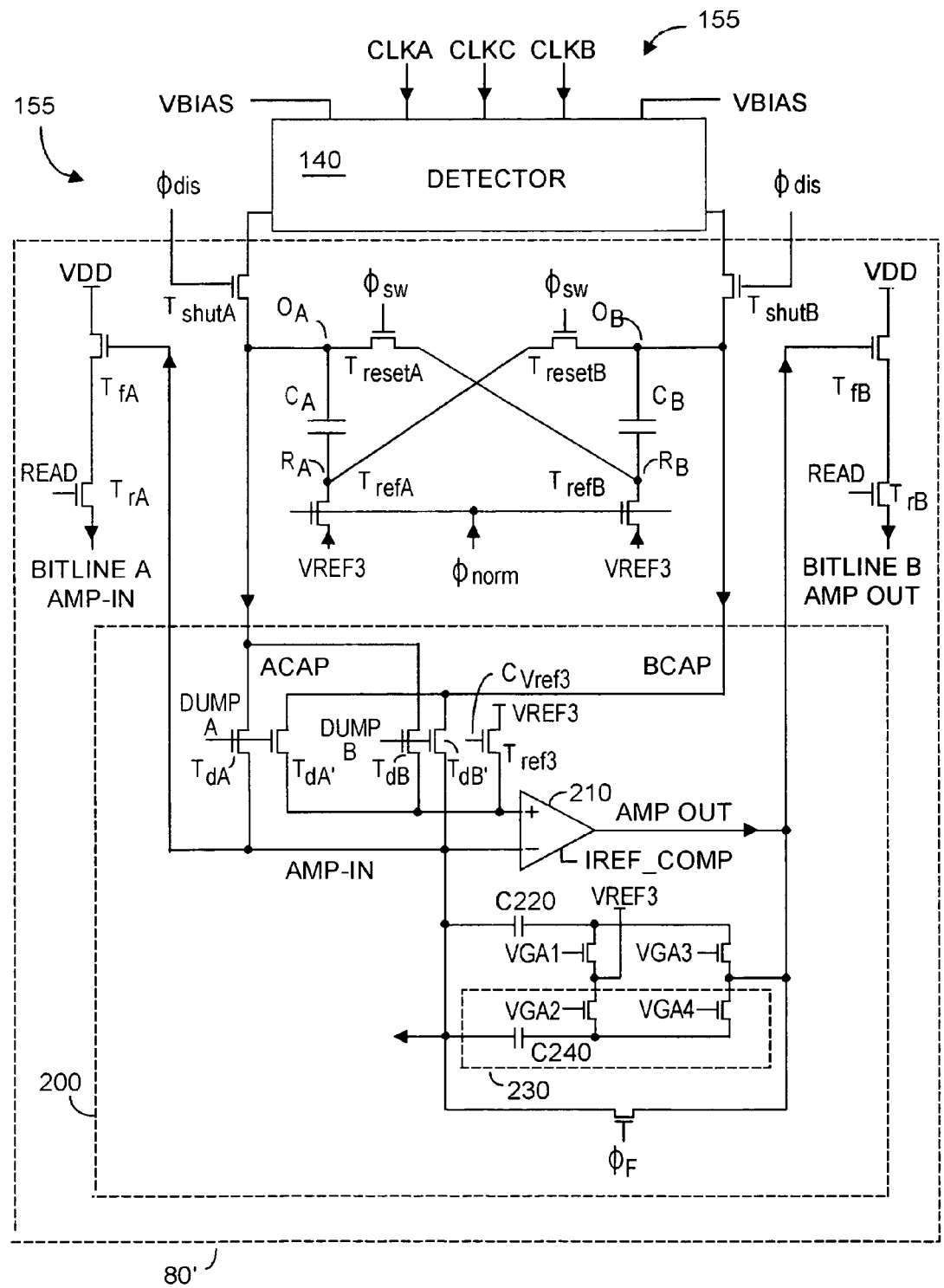
FIG. 4A depicts an embodiment of a differential common mode resettable sensor and associated switching transistors with enhanced performance, according to an embodiment of U.S. Pat. No. 7,176,438.
Figure 4B:
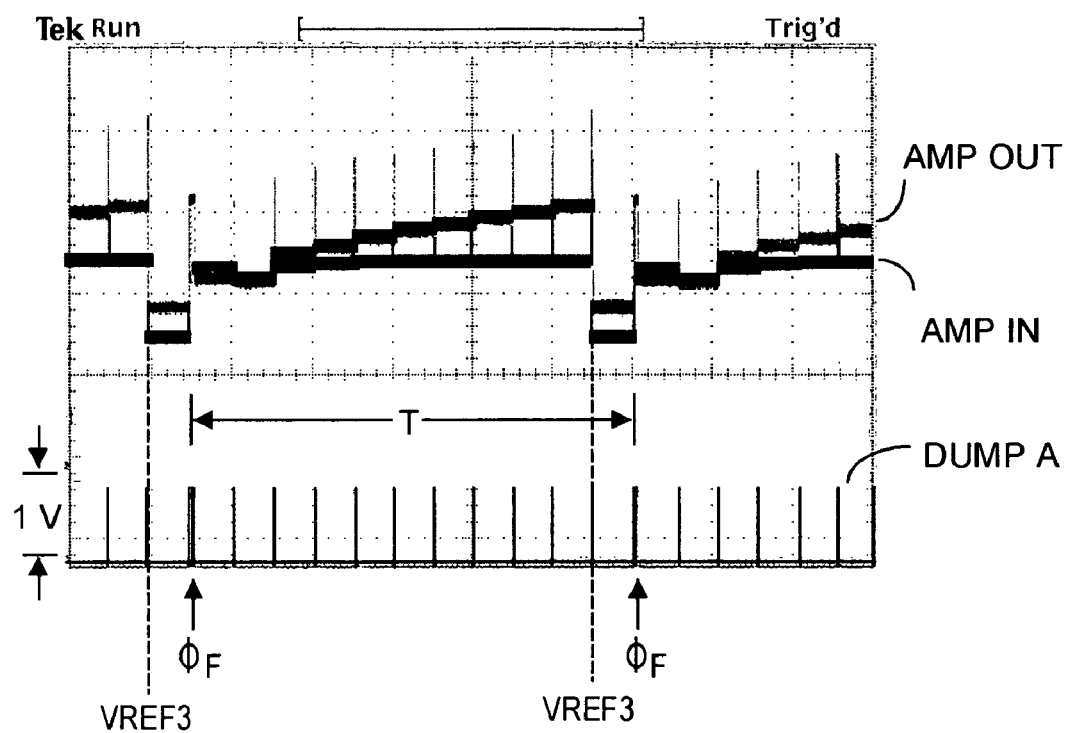
FIG. 4B depicts oscilloscope traces representing various waveforms for the embodiment of FIG. 4A, according to the prior art.
Figure 5A:
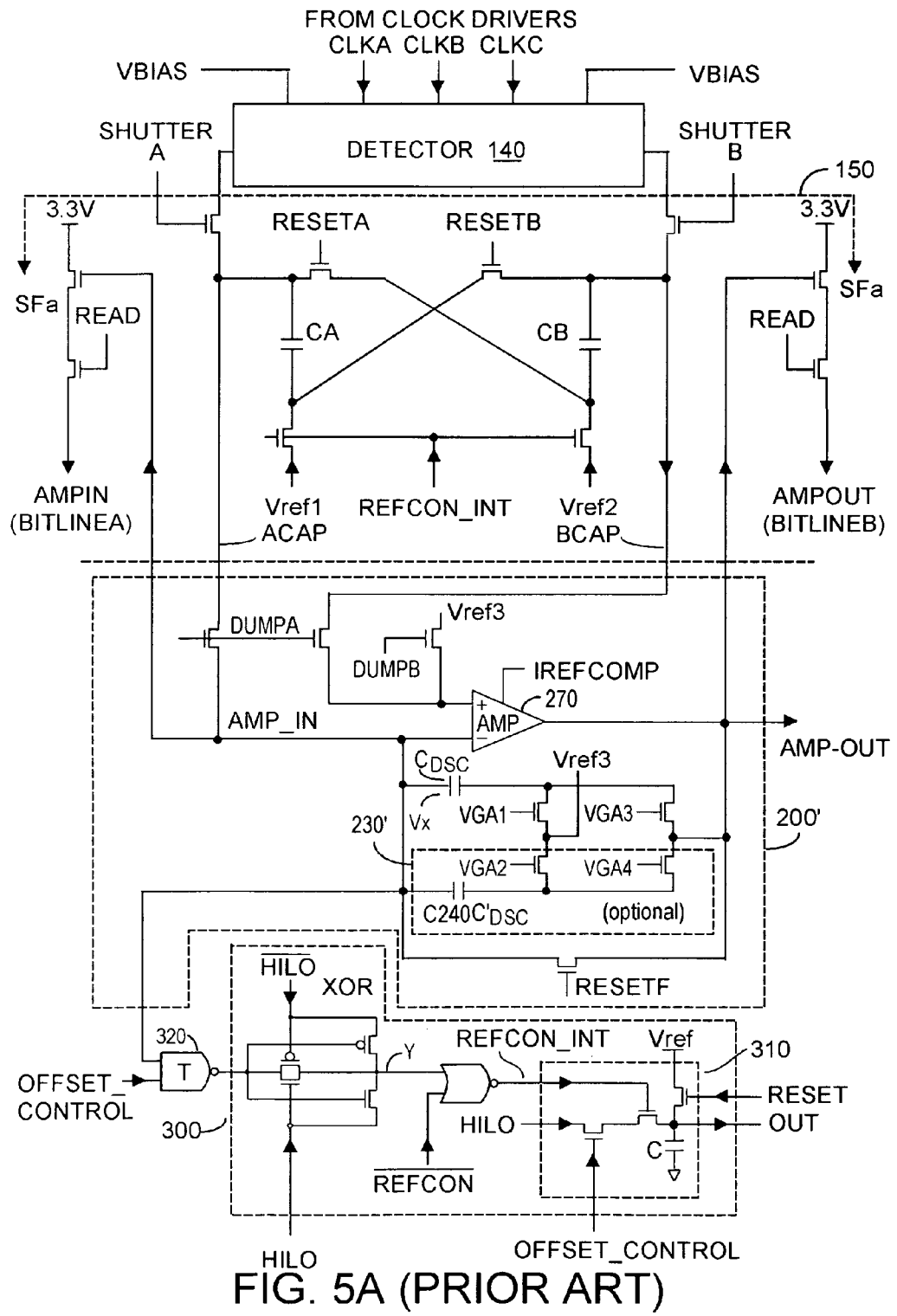
FIG. 5A depicts an embodiment of a differential pixel with improved differential dynamic range and signal/noise ratio, according to embodiments of U.S. Pat. No. 7,321,111.
Figure 5B:
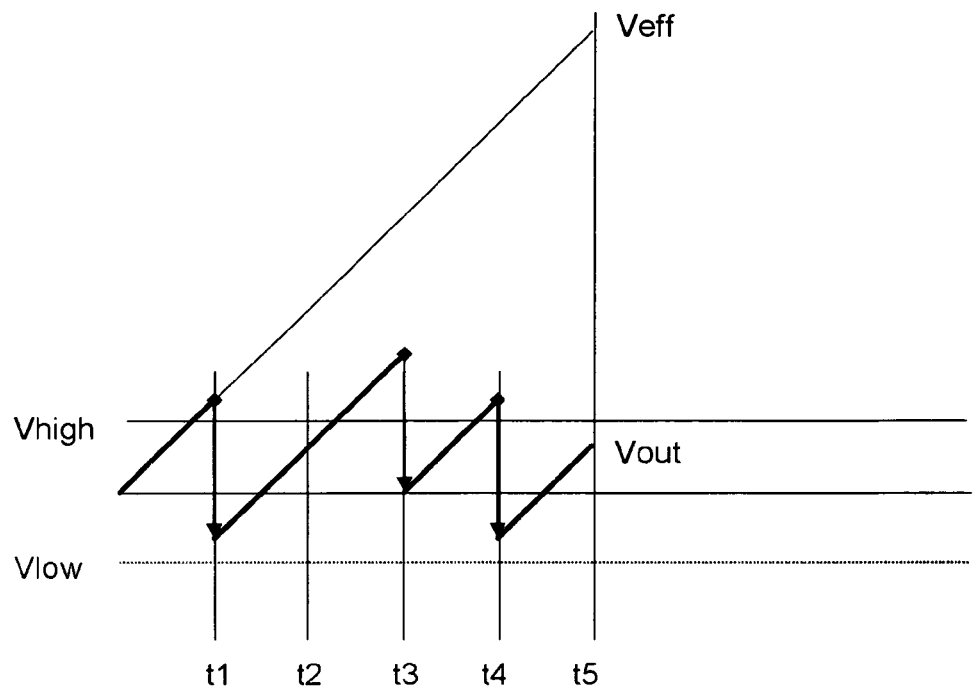
FIG. 5B depicts exemplary waveforms showing synchronous differential signal capacitor resetting to enhance large differential dynamic gain, according to an embodiment of U.S. Pat. No. 7,321,111.
Figure 5C:
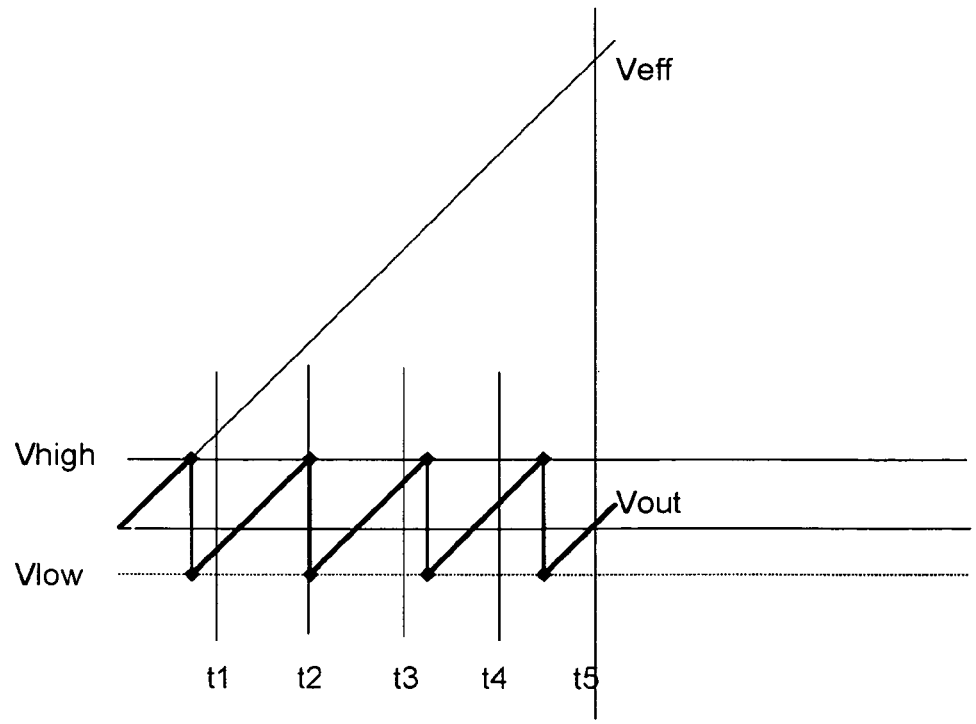
FIG. 5C depicts exemplary waveforms showing asynchronous differential signal capacitor resetting to enhance large differential dynamic gain, according to an alternative embodiment of U.S. Pat. No. 7,321,111.
Figure 6A:
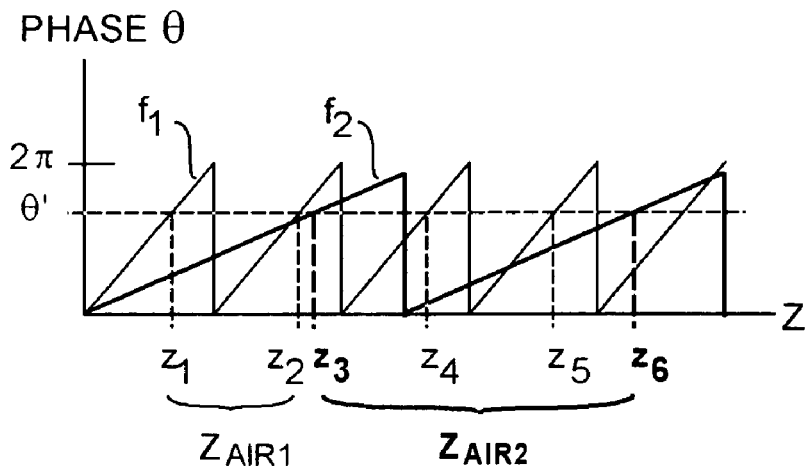
FIG. 6A depicts acquired phase-vs-distance Z for two modulation frequencies and demonstrates aliasing intervals, and distance ambiguity, according to the prior art.
Figure 6B:
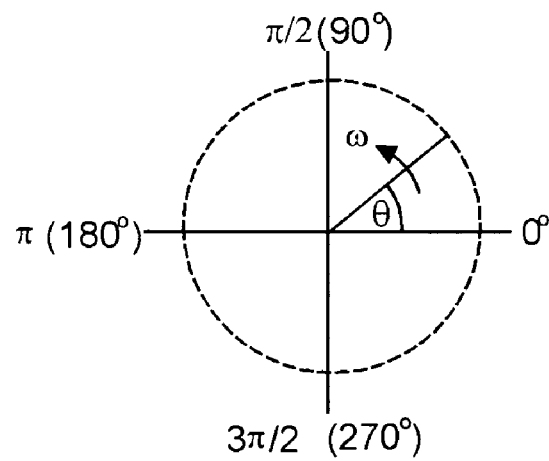
FIG. 6B is a polar representation of acquired phase data, according to the prior art.
Figure 8:
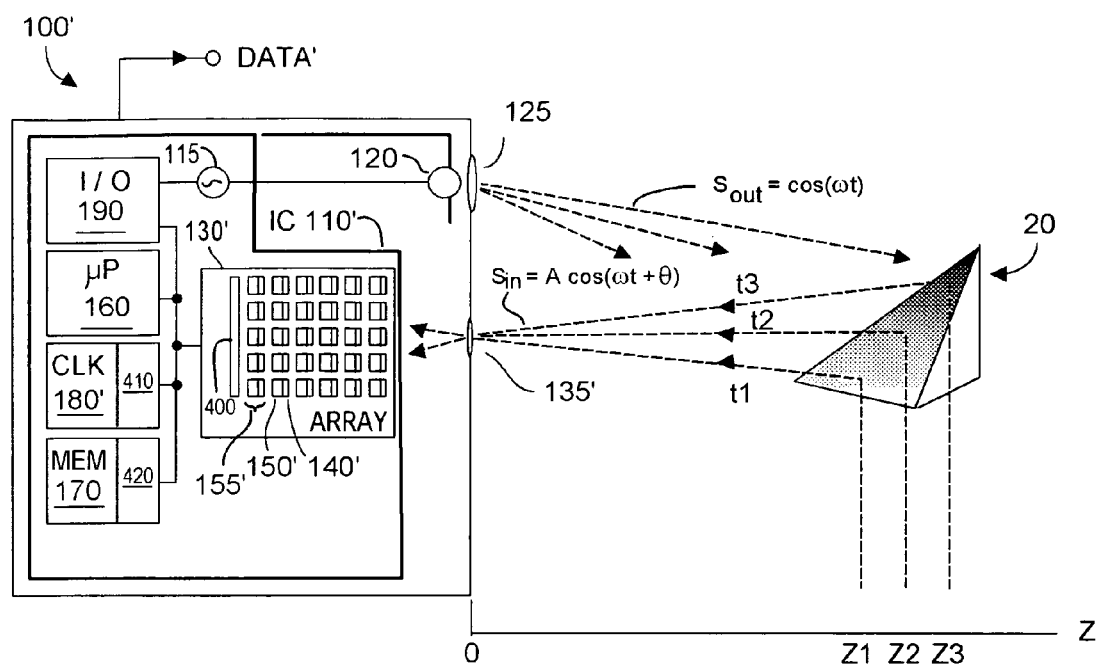
FIG. 8 depicts a generic TOF system will improved system architecture, according to embodiments of the present invention.

FIG. 8 depicts a generic TOF system 100', designed according to embodiments of the present invention. Preferably the area size required to implement individual pixels 155' within array 130' on IC chip 110' is reduced relative to prior art pixels described earlier herein. Note too the reduced size of optical system 135' as compared with optical system 135 in FIG. 1A. The smaller pixel size in array 130' in FIG. 8 can result in thinner and smaller diameter optics 135'.

System 100' in FIG. 8 benefits from reduced pixel area size by advantageously intelligently off-loading or removing from within the pixel certain circuitry, components, and/or functionality that in the prior art would be present in each dedicated detector electronics. In FIG. 8, 150' denotes the reduced-area electronics associated with each detector 140' in the array. In FIG. 8, block 400 denotes the off-loaded circuitry, components, and/or functionality that would otherwise be present in the dedicated electronics, which dedicated electronics would then of necessity have to occupy a greater area in the array region of IC chip 110'. While FIG. 8 depicts a phase-based TOF system 100', aspects of the present invention may also be carried out with non-phase-based type TOF systems, e.g., a time-of-flight counting system that directly measures the time delay for optical energy to travel from the system to and from a target object. Further, while detectors or sensors 140' preferably are differential and may be identical to differential detectors described earlier herein, aspects of the present invention may be carried out with single-ended detectors. In FIG. 8, clock circuitry 180' preferably includes functionality 410 which provides, as needed, timing and related signals to implement embodiments of the present invention. Further, memory 170 in FIG. 8 includes software 420 executable by processor 160 (or other processing resources) to carryout embodiments of the present invention.

Preferably a TOF system 100' should provide increased performance and features that include increased ambient resilience, increased dynamic range, low motion blur and long range operation at high resolution. As noted, to support such functionality, prior art TOF pixels were large because complex circuitry including analog circuitry was incorporated into dedicated electronics within the pixel. As noted, typical Canesta, Inc. prior art pixel sizes were on the order of perhaps 50 μm×50 μm, and more recently 40 μm×40 μm. Such relatively large pixel size in turn increased cost/pixel, which limited widespread deployment of TOF systems in low cost applications.

Further, large area size pixels limit the XY resolution that can be achieved using an IC die of any given size, thus increasing die size, rapidly increasing IC chip cost, as well as increasing the size and cost of the imaging optics that focus an object image onto the sensor. Furthermore a large die array of perhaps 7 mm×7 mm requires more operating power, which creates problems for the efficient distribution of high speed clocks. For many applications, cost considerations rule out increased die size. However to be enabled these applications must have sufficient XY resolution in terms of a large number of pixels, preferably at least about 120 rows×160 columns. In such an array, it is preferred that the pixels have advanced features such as reasonable ambient resilience, high dynamic range etc. One aspect of the present invention resolves these conflicting constraints to create a pixel that is small in area, generally about 20 μm×20 μm or smaller, e.g., about 15 μm×15 μm, while retaining desired enhanced functionality necessary to robustly enable desired applications. In the prior art, the area per pixel would be more on the order of 50 μm×50 μm.

In embodiments of the present invention, functionality is accomplished by replacing analog circuitry that in the prior art is found inside the pixel, with digital circuitry off-loaded and implemented outside the pixel, e.g., within block 400 in FIG. 8. TOF system 100' typically acquires Z images at a frame rate, perhaps 60 frames/sec. or 30 frames/sec. In such embodiments, a frame period is about 14 ms for 60 frames/sec. and about 30 ms for 30 frames/sec. In a single frame period, analog values from the pixel are repeatedly sampled at each slice/capture using fast analog-digital converters (ADCs). As such, it is understood that a single frame encompasses many captures or slices. Each capture or slice (capture and slice are often used interchangeably herein) may be said to have a set of operating parameters that define an operating regime for that capture. For example, parameters may include frequency, phase (0°, 180°, etc.). The pluralities of sampled digital values are manipulated digitally, preferably on IC chip 110', to ultimately yield a compact data from which three-dimensional information can be ascertained. Advanced functionality such as high ambient resilience of dynamic range is achieved by in part repeatedly sampling the analog values from the pixel, and judiciously storing and combining the digitally converted values. In a single capture period, one might have perhaps 10 to 40 samples, but these figures could change depending upon the sequence used. "Sequences" as used herein are defined later herein, but basically are a combination and ordering of symbols, e.g., S0, I0, where each symbol translates into an instruction to be executed. In the exemplary sequence noted later herein, the number of samples is six. According to embodiments of the present invention, only operations sufficiently small to implement in the analog domain and too onerous to implement fully digitally are left to be implemented within the pixel.

Conceptually, intermediate values are produced where each intermediate value may be created using different conditions (i.e., different light phases/frequencies), and may be combined differently with prior results (e.g., 0° vs. 180°). Concepts of time slice reduces motion blur reduction because slices are repeated and applied in a "comb-like" fashion.

With a smaller pixel area, perhaps 15 μm×15 μm, one cannot aggregate results continuously within the pixel, and instead multiple analog values from the pixel are sampled using a fast ADC system, e.g., perhaps 100 Msamples/second, and manipulated in the digital domain. This off-loading approach produces intermediate results, which are then combined off the pixel array in a preferred fashion so as to achieve improved functionality. Preferably intermediate results produced under different conditions can be combined in the digital domain.

Preferably the results are accumulated within the pixel only for short amounts of time, e.g., slices, perhaps 300 μs to 2 ms, before being siphoned off to the digital domain. Such pushing back of data manipulation to the digital domain allows increased flexibility. By performing correlated double sampling different intermediate samples preferably may ideally correspond to different conditions, e.g., different light phases to reduce motion blur effects, different frequencies to achieve dealiasing. As used herein, correlated double sampling means sampling the signal at two different times and noting the difference. Such sampling advantageously can remove fixed pattern noise by sampling reset and signal values. Each time the analog data is transferred to the digital domain, the conditions for the next accumulation can be changed. Resetting in general introduces undesired kT/C noise, or requires a post-reset sample to try to cancel the just introduced kT/C noise. In a preferred embodiment, frequent pixel resetting is to be avoided. Further, after sampling, phase is preferably switched (e.g., from 0° to 180°). However, it is preferred to ensure that effects of changing conditions midstream, e.g., without resetting the pixel, are cancelled and pixel saturation is avoided. This can be achieved by balancing the sequence of operations performed such that every segment has a corresponding complementary segment later in the sequence, to achieve differential cancellation of mal-effects.

For example to reduce motion blur, it is necessary to spread the different phases (0°-90°-180°-270°) over the entire frame, e.g., 30 ms for 30 frames/sec., preferably by changing light phase between two samples. Similarly 0°-180° cancellation can be achieved by combining intermediate results produced by 0° and 180° light phases from different slices. For dealiasing, data can be collected by changing frequency of emitted optical energy between slices.

A conceptual description will now be given from the point of view of intelligently shifting or off-loading some circuitry outside the pixel. One consideration in designing the architecture for a TOF array 130' is to intelligently decide what circuitry or functionality should remain implemented within the area of pixel 155', and what circuitry or functionality should be off-loaded to outside the pixel area, e.g., perhaps to be implemented within block 400 (see FIG. 8). A typical pixel requires for good performance the following components or functionality: a detector (A), a CMR capacitor and switches (B), clock drivers (C), amplifier (D), feedback capacitor or other accumulator (E). Depending on the number of accumulators, one may store integration slices of different kinds, e.g., different phases (perhaps 0° and 90°), and different frequencies, e.g., F1, F2, here a total of four accumulators. So doing can implement addition features such as reduced motion blue (using two phases), and dealiasing (using two frequencies). Understandably implementing additional features tends to add additional components and complexity and area demand upon pixel 155'.

Smaller sized pixels may be implemented with only basic elements such as the detector, CMR capacitors, and a few switches, but performance suffers from differential loss that occurs with every CMR, perhaps 10% to 20% loss. As noted earlier herein, adding a feedback capacitor and amplifier within the pixel can eliminate the differential loss caused by CMR by regularly storing intermediate charge on the feedback capacitor. Requirements for better performance and more features, e.g., ambient resilience, motion blur, etc. translate to still more circuitry and more complexity within the pixel. Understandably better performance results but at the cost of larger pixel area and higher fabrication cost. Thus, to lower cost using smaller area pixels, desired performance and features should be implemented at little increase in pixel area.

Figure 7A:
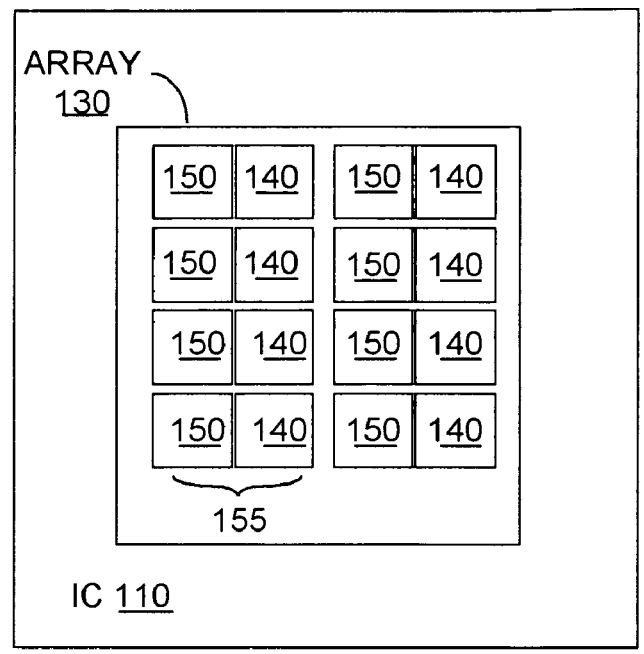
FIG. 7A depicts an array of pixels, according to the prior art.
Figure 7B:
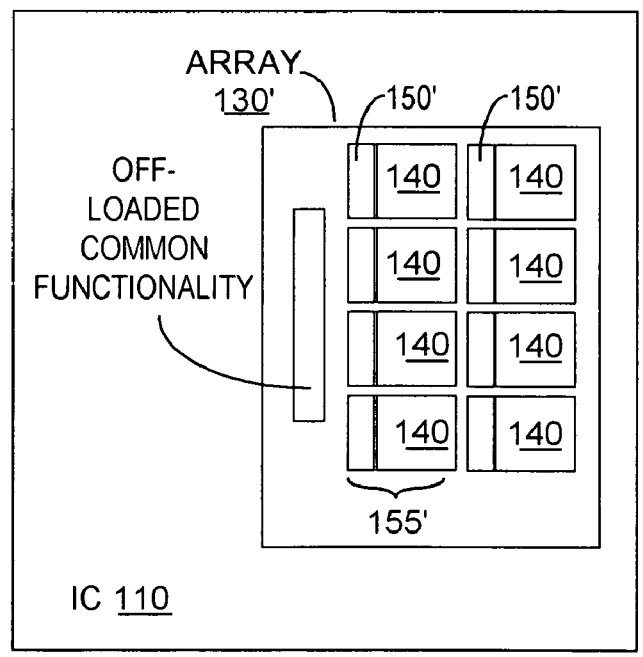
FIG. 7B depicts an array of pixels and off-loaded circuitry and/or functionality, according to embodiments of the present invention.

One preferred approach to reduce pixel area size while retaining the functionality and performance of a larger pixel is to intelligently move or off-load at least some of the analog circuitry out of the pixel area. It is suggested here as shown in FIG. 7B to move some of the analog circuitry out of the pixel. Typically such analog circuitry is area intensive and preferably can be invoked relatively infrequently. In some embodiments, additional digital infrastructure may be added on-chip to aid with extra operations needed to improve quality of data accumulated from the TOF system. Intelligently deciding how to choose what stays in the pixel and what can be moved off-array involves various balancing tradeoffs as described below. As elements are off-loaded from the pixel, interactions between these elements and the pixel array necessitates and in some instances enables some operations that actually result in better data.

Thus, a goal of the preferred methodology is not simply to reduce the pixel array area but to also reduce the total IC chip area. Thus, if circuitry off-loaded from the pixel does not accomplish both goals, the method is deemed unsuccessful. Accordingly, a careful balance between performance and area is required to make this method successful.

Various scaling considerations will now be described. As pixel area size shrinks, some components within the pixel scale with the pixel size while other components do not scale. For example, detector, capacitors will scale with the size of the pixel, whereas switches, amplifiers, and other analog circuitry will not scale. Thus, to achieve a small pixel area, preferred embodiments seek to off-load or remove from the pixel area the switches, amplifiers, clock drivers. These components and functions preferably are located off-pixel and array, e.g., within block 400. But in practice not all such elements are readily off-loaded from the pixel, and the pros and cons of each non-scalable element must be considered.

In addition to the detector and CMR capacitors, some switches used to control integration and CMR will remain within the pixel. Preferably the amplifier and feedback capacitor that serves as memory can be off-loaded out of the pixel array, as can switches associated with the DUMP operation.

A smaller pixel area translates to a smaller pixel array area, perhaps 6 mm*8 mm for a 50 µm×50 µm pixel array of 120 rows×160 columns and 1.8 mm×2.7 mm (about 10× smaller area) for a 15 µm×15 µm pixel array of 120 rows×160 columns. This means lower wiring capacitance and lower capacitive loading of the clock signals. With larger sized prior art pixels, clock drivers were present in the pixel, however in the present invention with its smaller load capacitance, the drivers can be off-loaded outside the array, and only one driver is required per column. In some embodiments clock signals and bit lines are preferably swapped with clock signals and bit lines, respectively, of neighboring pixels for alternate row(s) of pixels in the array.

In practice it is not practical to aggregate the charge on the feedback capacitor (accumulator) outside the array after each integration and CMR operation. This would have to be done for the whole array, row by row, which would add much overhead time to the frame. More preferably, embodiments of the present invention allow the differential signal to accumulate on the CMR capacitor, which signal is then periodically sampled on the accumulation capacitor outside the array. However this will introduce some differential loss depending on the number of CMR's between dumps. Repeated sampling of the pixel during a single readout requires a memory array outside the pixel array with an ability to add/subtract interim pixel outputs from the memory output. Such math is easily handled in the digital domain, which can pave the way for an analog to digital conversion before siphoning off the charge to the memory.

As will now be described, some operations are deemed global, while other operations are deemed local in nature. Operations that are performed locally and with higher frequency such as integration, and CMR preferably will have the supporting circuitry within the pixel. These operations are performed globally for the whole array at the same time, which requires per-pixel detector and capacitive elements.

Operations such as Dump/Read/ADC are also performed on the whole array but are performed one row at a time. Thus in some embodiments, circuitry used in the Dump/READ operation, which is performed infrequently, can be off-loaded from the pixel, and only one circuit per column may be required.

In practice, assume total read-time overhead is 30% of the total time per frame. This can be translated to a specific ADC speed and can restrict the number of Dump/READ operations. Because each Dump/Read operation adds readout noise per occurrence, it is desired to minimize the number of Dump operations. But a higher number of CMRs between dumps is also undesirable as resulting in greater differential signal loss. Thus, accuracy required from the ADC data and speed will be considered in determining resolution and area occupied.

By way of example, if m bits of resolution is required, and if time $T_{dump}$ is the time taken per row per dump, then total time taken by the array for each dump is $N_{row}*T_{dump}$. If $N_{dump}$ is the total number of dumps per frame, then $N_{dump}*N_{row}*T_{dump} \leq 0.3*T_{total}$. All other parameters being known for a particular sequence of operations and applications, $T_{dump}$ can be calculated. $T_{dump}$ will include time taken by the ADC as well as the ALU to accumulate the digital values in the memory array.

It is impractical to off-load all processing from the pixel. Depending on the processing required, so doing can result in many wiring connections between the pixel array and the off-loaded processing elements. Disadvantageously this can lead to both a large pixel area and overly complex interconnections between the pixel array and post-processing. It is advantageous to do some basic initial processing within the pixel and to off-load processing that can be done infrequently outside the array.

In embodiments of the present invention, sequences and combinations of intermediate results may be combined in different ways. It is useful at this juncture to describe the concept of microcoded architecture, developed for embodiments of the present invention. Various sequences of operations such as integration, CMR, and ADC may be performed within the IC chip. The chip itself often incorporates logic to issue the sequences and analog and signal logic to accomplish operations of the sequence. Using an external chip to create the sequences and external analog and digital logic to execute the operation is in many cases too expensive and onerous, especially if critical data needs to be sent of and on chip during such operations. In the prior art much of the functionality was implemented within the (large) pixel in the analog domain, and the sequence of operations that a pixel or chip must perform is relatively restricted. For example, at best, in some prior art configurations perhaps chip operation was characterized by control registers that set various parameters of operation. Such control registers parameters might contain number of CMR's or dumps to perform for a total integration period. But even with such control, the system was still relatively inflexible. By contrast, such undesired inflexibility in many prior art configurations is avoided according to embodiments of the present invention.

In the present invention, moving functionality into the digital domain gives added flexibility and opens up the possibility of using more complex sequences. Furthermore once the data is in the digital domain further increases in functionality and flexibility may be obtained at low expense, provided the operating sequence is customized for the particular operating mode.

Such flexible and complex sequences cannot be readily expressed simply by changing parameters on a fixed flow chart. The flowchart itself must be modified to adapt to the new sequence. To enable this flexibility, applicants have developed a new architecture called microcoded architecture. In preferred embodiments, each of the various operations on the chip is associated with a symbol, and each symbol is associated with waveforms for a set of signals associated with that symbol. Preferably a string of such symbols is used to define the operating sequence of the chip. Preferably this string of instructions is stored on the chip, e.g., in memory 170, and a microcontroller, perhaps processor 160, also preferably in the chip interprets the string. Every time a symbol is executed, the waveforms associated with that symbol are applied to the signals associated with that symbol.

Figure 9:
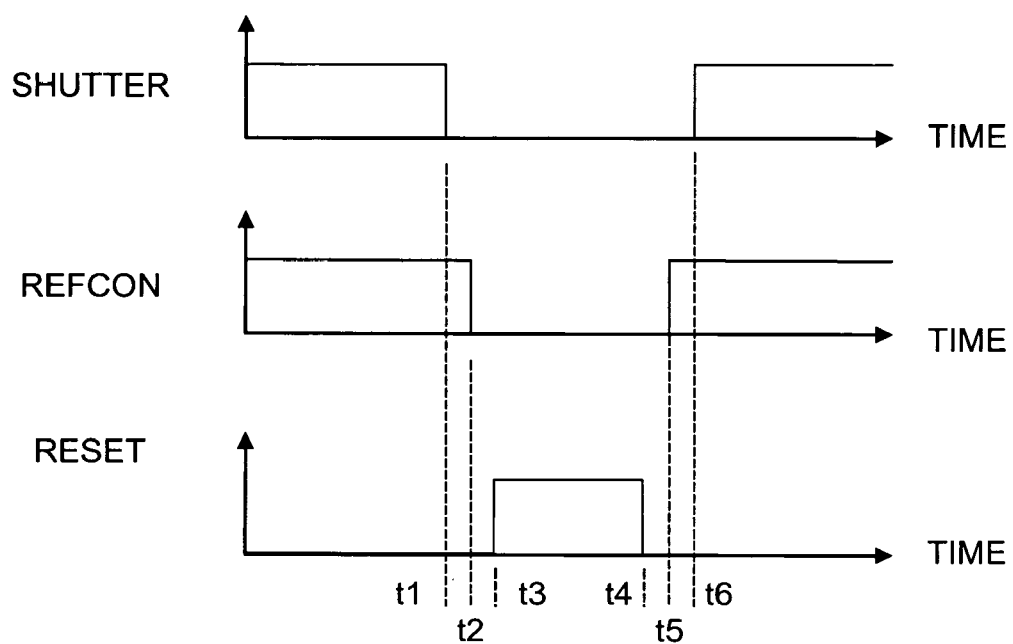
FIG. 9 depicts waveforms and signals associated with a typical CMR operation, according to embodiments of the present invention.

For added flexibility the waveforms and signals associated with a symbol may be programmable. Thus new symbols can be defined on the fly by storing their waveform and signal definition in memory preferably inside the chip. By way of example, FIG. 9 depicts how a CMR operation can be defined. Memory block stores the definition for the symbol. In FIG. 9, the symbol header is CMR, and the following waveform definitions are used. In a Transition Time table for signal Shutter, the signal falls at $t_1$ and rises at $t_6$. In a Transition Time table for signal Refcon, the signal falls at time $t_2$ and rises at $t_5$. In a Transition Time table for signal Reset, the signal rises at $t_3$ and falls at $t_4$.

System flexibility is further enhanced by adding symbols typically associated with microprocessor instructions, e.g., jump, subroutine call, increment/decrement, and compare.

Figure 10:
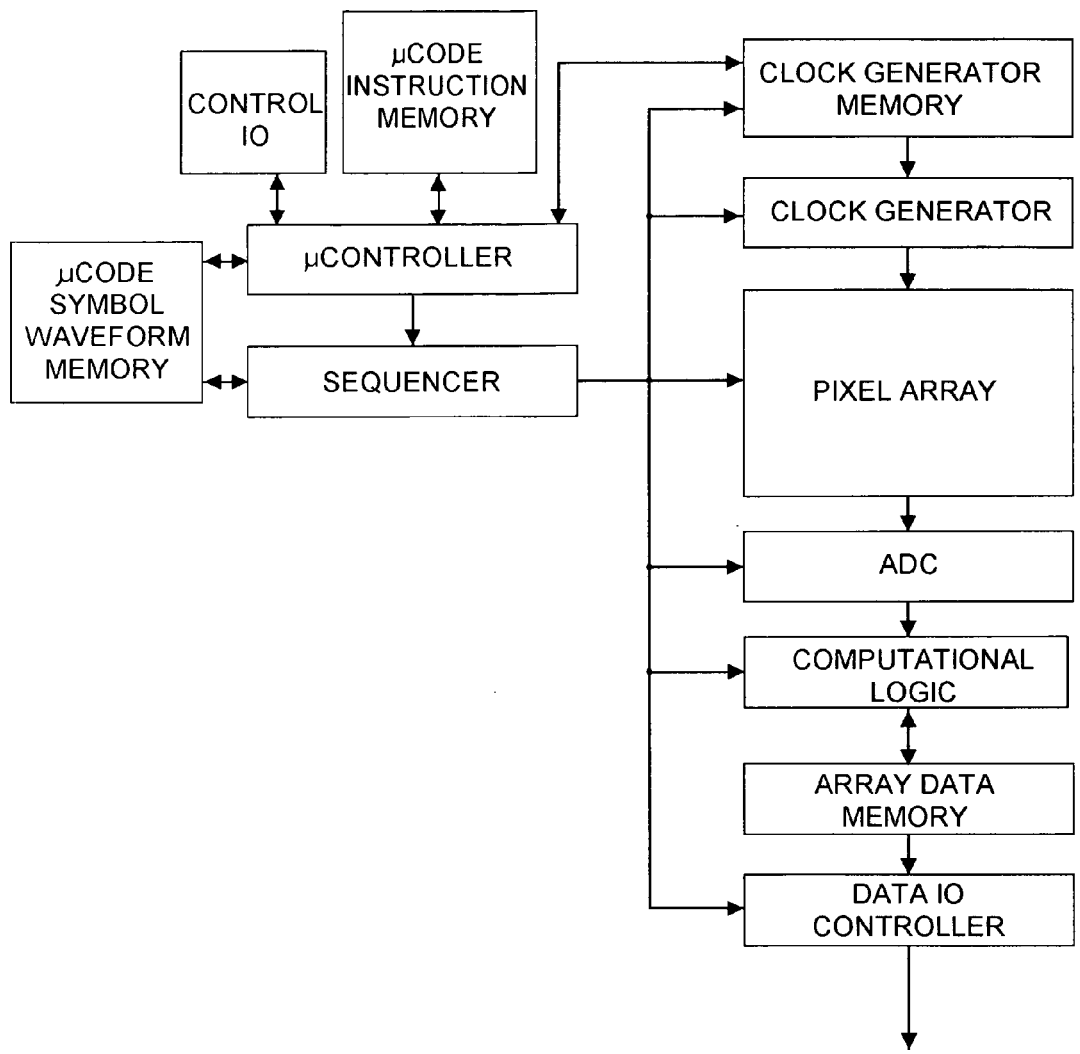
FIG. 10 depicts exemplary microcoded architecture, according to embodiments of the present invention.

FIG. 10 depicts an exemplary overall microcoded architecture. The Instruction Memory stores the instructions, the Symbol Memory stores the symbol waveform definitions, Processor reads the instructions sequentially and programs the waveform generator band with the waveforms for the symbol being executed. The ADC bank converts differential and common mode values from the pixel into digital values. Under control of instruction memory symbol memory and processor, the computational logic takes the values from the ADC and memory computes a function from them and stores the result back in Array Data Memory, which stores the values from the computational logic. Under control of instruction memory symbol memory and processor, the IO preferably sends the results of data memory off-chip, or elsewhere.

Consider now typical microcode fragments and accumulation waveforms as used herein. Table 1 below enumerates typical symbols used in embodiments of the present invention.

TABLE 1

| | |
|---|---|
| R | Reset Pixel |
| CL0 | Clear Digital Accumulator A0 for 0 (and 180) phase |
| I0 | Integrate with LS phase 0 for time T |
| I180 | Integrate with LS phase 180 for time T |
| C | Common Mode Reset |
| S0 | ADC pixel output to 9 bits and accumulate in digital accumulator A0 with '−' sign. (aka Start phase 0 integration) |
| D0 | ADC pixel output to 9 bits and accumulate in digital accumulator A0 with '+' sign. (aka Dump phase 0 integration) |
| S180 | ADC pixel output to 9 bits and accumulate in digital accumulator A0 with '+' sign. Similar result as D0. (aka Start phase 180 integration) |
| D180 | ADC pixel output to 9 bits and accumulate in digital accumulator A0 with '−' sign. Similar result as S0. (aka Dump phase 180 integration) |
| X0 | Read accumulator A0 |

A typical sequence may be represented by:
R:CL0:S0:((I0:C:)$^k$: D0:S180:(I180:C:)$^{2k}$: D180: S0 :(I0: C:)$^k$)$^n$: D0:X0

Figure 11:
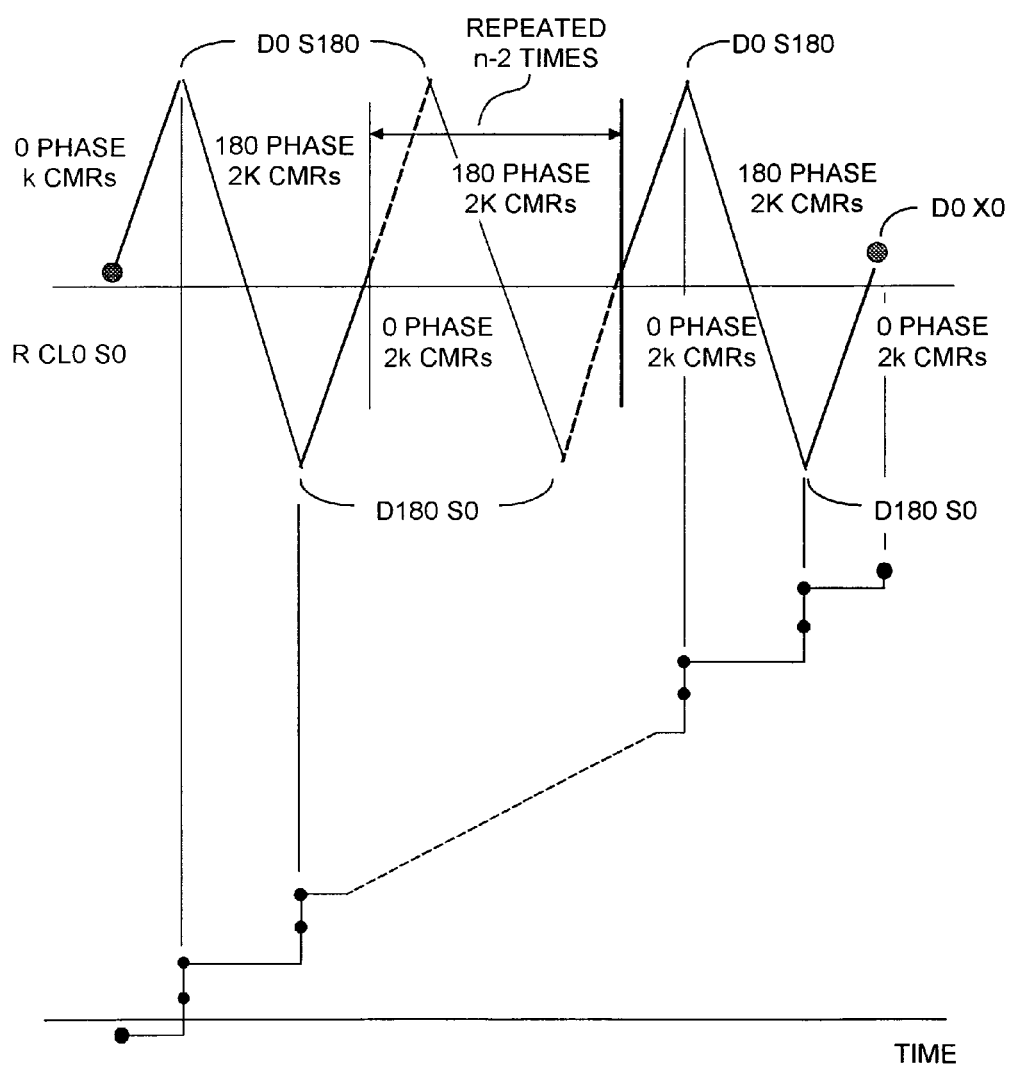
FIG. 11 depicts exemplary differential detector output values responsive to application of a sequence, according to embodiments of the present invention.

The associated waveforms are shown in FIG. 11, wherein the pixel is reset and the accumulator for phase 0° and 180° is cleared. The pixel values are then sampled into the accumulator with a minus (−ve) sign. This is followed by k 0-phase integrate CMR sequences (0 half cycle), at which point the pixel value is sampled with a positive sign. This double sampling has the effect of only storing the pixel output accumulated between the two samples (S0 and D0). The next two samples (S180 and D180) add the value accumulated by the 2k 180°-phase integrate CMR (180° full cycle) with a minus (−ve) sign. After an initial sample S0, if n=1, a 0 half cycle is performed and sequence is terminated by the corresponding D0. If n>1, instead of a 0 half-cycle, a 0 full cycle is performed before the corresponding D0. This pattern is repeated by alternating between 0° and 180° phase depending on n. The sequence is terminated by a 0°-phase half cycle in the end before the data is read out by X0 operation. Note that D0 and S180 (respectively D180 and S0) are essentially the same operation, and in FIG. 11 they often appear to be consecutively. Thus rather than doing two analog-to-digital conversions and then adding (or subtracting) each result to memory, it is computationally more efficient to do a single analog-to-digital conversion, multiply the result by two, and add (or subtract) the result from memory.

Figure 12:
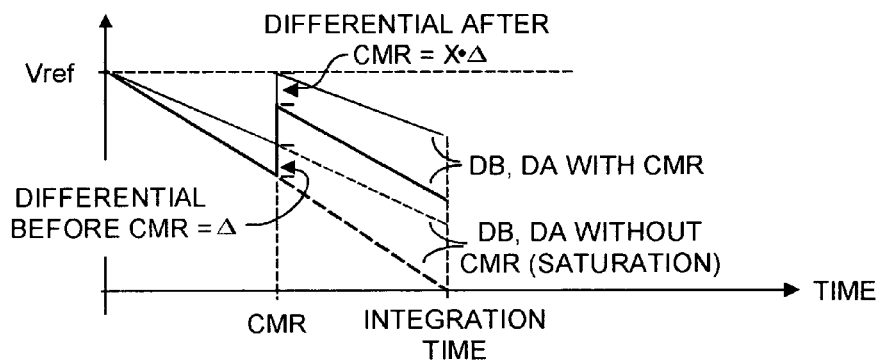
FIG. 12 depicts common mode reset (CMR) signal waveforms in pixel embodiments using CMR.

Each common mode reset (CMR) can result in undesirable loss of the differential signal, which loss can be reduced by reducing the effective number of CMRs, with accompanying improvement in noise characteristics. FIG. 12 depicts exemplary waveforms found in TOF pixels that use CMR to promote good resilience to high levels of ambient light. As described in U.S. Pat. No. 7,176,438, using CMR capacitors alone, a fraction of the differential signal is lost at each CMR operation, as reflected by a portion of FIG. 12. Thus, if the differential charge value is read out after a large number of CMRs (e.g. 100) a large fraction of the charge will be lost. But as described in U.S. Pat. No. 7,176,438, the differential charge can be stored in a feedback capacitor located within the pixel, where the stored charge is not disturbed by subsequent CMRs. So doing required an in-pixel amplifier and an extra feedback capacitor which may be onerous to implement within a small area pixel.

Figure 13:
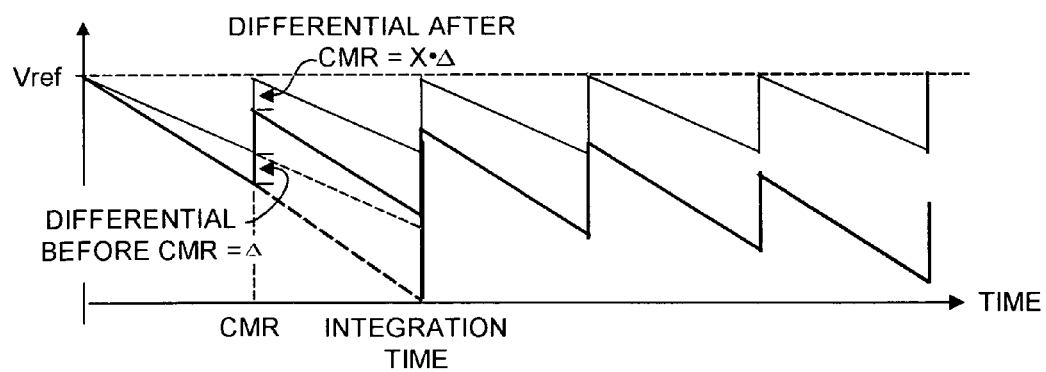
FIG. 13 depicts an exemplary signal trace for a differential signal on a CMR capacitor for five integration CMR slices, according to an embodiment of the present invention.

An alternate method that does not require an in pixel feedback capacitor and amplifier will now be described with reference to FIG. 13. In this method the differential charge value is read out periodically after a comparatively small (e.g. 5) number of CMRs. The differential signal loss during those few CMRs is acceptable. Preferably the differential charge read out is stored in digital memory where it is safe from further CMRs and is accumulated with subsequent readouts. FIG. 13 depicts an exemplary signal trace for the differential signal on the CMR capacitors.

An explanation of CMR differential loss and its role in avoiding high effective CMRDL will now be given. If x is fraction of charge that is retained with every CMR, then for five integrate and CMR slices, where each integrate adds a differential charge $\Delta$, the charge accumulated after five slices would be $\Delta((x)^5+(x)^4+(x)^3+(x)^2+(x))=\Delta*x*(1-(x)^5)/(1-x)$ instead of $5\Delta$. The effective fraction of charge retained after 5 slices is $x*(1-(x)^5)/(5*(1-x))$. For x=80%, this number is 53.79%, i.e., 46.21% charge is lost. Clearly more than five CMR's would lead to a much higher loss, necessitating the need to read out intermediate values before the effective CMR differential loss becomes too big.

A preferred method of canceling reset kT/C noise using double correlated sampling will now be described with reference to FIG. 14. kT/C noise is introduced every time the pixel is reset, and is not fully cancelled despite double correlated sampling due to CMRs that occur between samples. Depending on the sequence used, this quantity can be attenuated to a large degree. Assume that Reset kT/C noise N is introduced after a reset, the following CMRs will attenuate it. Assume each CMR introduces a differential loss of (1−x), then using the principle of superposition, the contribution of N at each read operation is shown for the sequence shown in FIG. 14.

Figure 14:
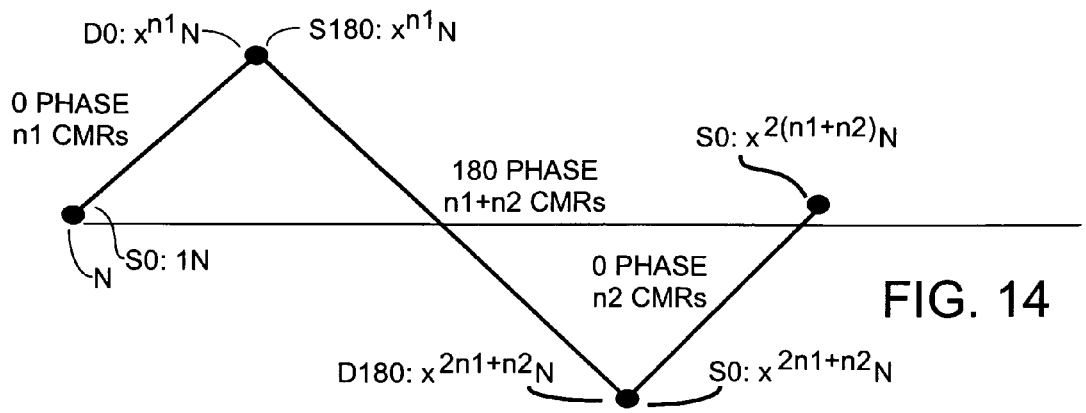
FIG. 14 depicts reset kT/C noise attenuation, according to an embodiment of the present invention.

In FIG. 14, the total response of the system to differential kT/C noise N is given by: $-N+2*x^{n1}N-2*x^{2n1+n2}N+x^{2(n1+n2)}N=\alpha N$ where $0<|\alpha|<1$.

Based on the sequence chosen and the differential loss introduced by the CMR, $\alpha$ can be estimated. The output of the first read from the ADC is 1N. If the value of $\alpha$ is known, rather than store −1N in the accumulator, one can store −(1+$\alpha$)N in the accumulator by multiplying the output of the ADC by (1+$\alpha$) for this particular read operation. The system response to N is then exactly 0 because −$\alpha$N is preemptively added to the accumulator and will cancel with $\alpha$N the response that otherwise accumulates in the accumulator.

Figure 15A:
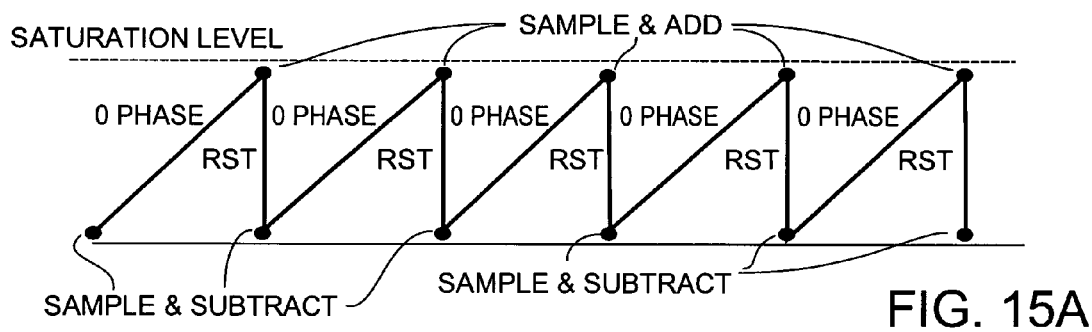
FIG. 15A depicts an exemplary waveform demonstrating need for frequent resets to avoid pixel saturation, according to an embodiment of the present invention.
Figure 15B:
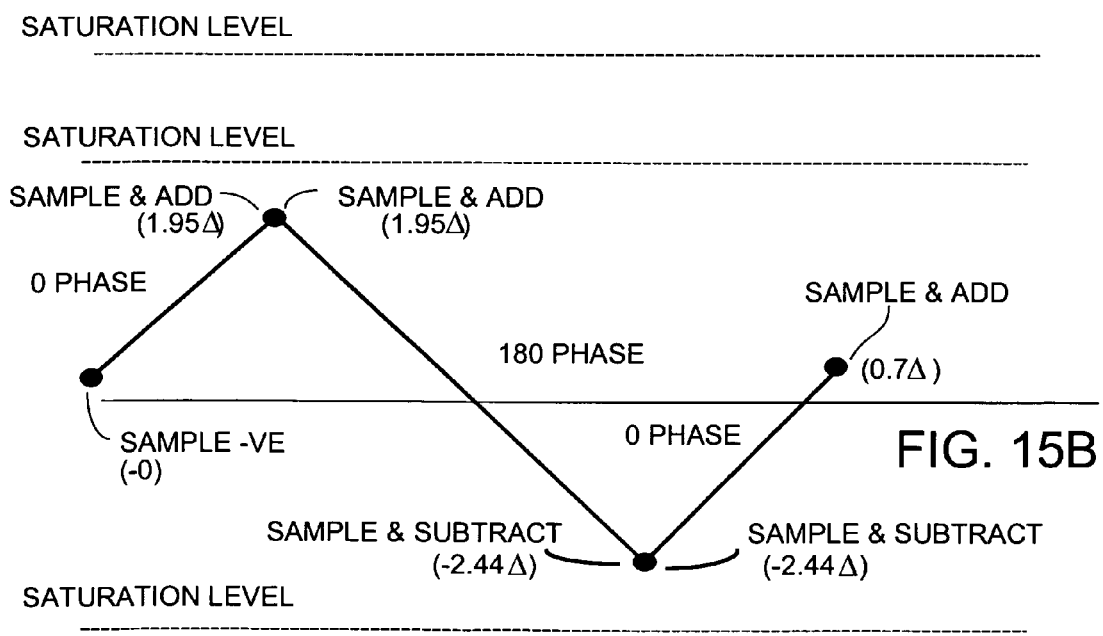
FIG. 15B depicts an exemplary waveform demonstrating a sequence of operation to avoid differential pixel saturation with reduced number of resets, including exemplary differential values resulting from a sequence, according to an embodiment of the present invention.

Consider now 0°-180° cancellation and pixel saturation avoidance with respect to FIG. 15A and FIG. 15B. Pixel saturation will occur unless charge is stored in an off-pixel location after some interval of time, and the pixel is reset as shown in FIG. 15A. To avoid pixel reset every time the pixel is close to saturation, a sequence of operations can be performed whereby the direction of the accumulation is changed, as shown in FIG. 15B. Preferably these intermediate values in the pixel are stored off-array for better data and to avoid losing useful information in the pixel. This may be handled by repeatedly sampling pixel values during a single readout every time direction is switched.

From the foregoing it will be appreciated that substantial flexibility is now provided to the design engineer with respect to system configurations that advantageously reduce pixel area size yet manage to achieve high dynamic range. For example, one could implement a switchover to 180° at each dump to ensure that differential values on a differential pixel never exceed the differential value accumulated between dumps. Preferably pixel analog values would be sampled frequently in the digital domain to help avoid pixel saturation and to reduce CMR differential loss introduced by CMRs. As shown by FIG. 15B, switching phase for integration helps both 0°-180° cancellation and in avoiding pixel saturation. Switching the direction of the integration, e.g., from integrating 0 followed by integrating 180, as shown in FIG. 11 advantageously limits the absolute pixel output value. This in turn reduces the dynamic range requirements for the ADC that is used.

Consider the following sequence: RST:CL0:S0: (I0: CMR:)$^3$ D0:S180: (I180:CMR:)$^6$ D180:S0: (I0:CMR:)$^3$ D0: X0. Initially the pixel is reset, and the differential value set to zero and then sampled. If CMR differential loss is 0.8 and if each integration adds a differential signal of $\Delta$, the second sample D0 is equal to $\Delta*0.8*(1-0.8^3)/(1-0.8)=1.95\Delta$. Preferably the direction of integration is now switched to 180°, and after six integrate and CMR slices, the new differential value is $1.95*0.8^6\Delta-\Delta*0.8*(1-0.8^6)/(1-0.8)=(0.51-2.95)*\Delta=-2.44\Delta$. After sampling this value, the integration slices are again changed to phase 0° and the new differential value is $-2.44*0.8^3\Delta+\Delta*0.8*(1-0.8^3)/(1-0.8)=(-1.25+1.95)*\Delta=0.7\Delta$. This is depicted in FIG. 15B, with reference to the bracketed values, e.g., (1.95$\Delta$). In this example, with reference to the bracketed values, the total signal accumulated in the digital accumulator is given as $(-0+1.95+1.95-(-2.44)-(-2.44)+0.7) \Delta=9.48\Delta$.

Figure 16:
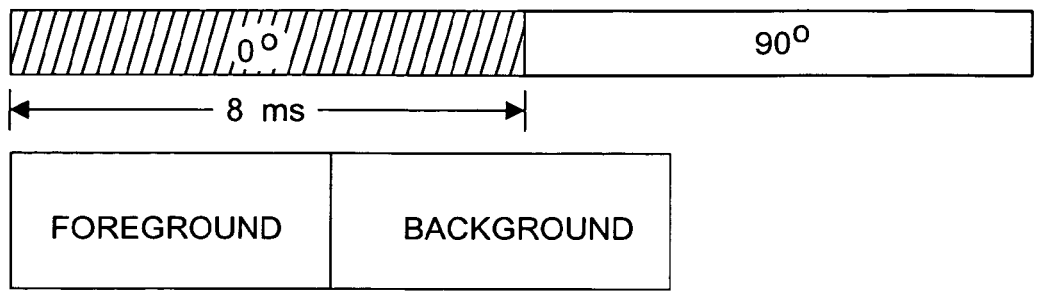
FIG. 16 depicts use of interspersed captures to reduce motion blur, according to an embodiment of the present invention.
Figure 16:
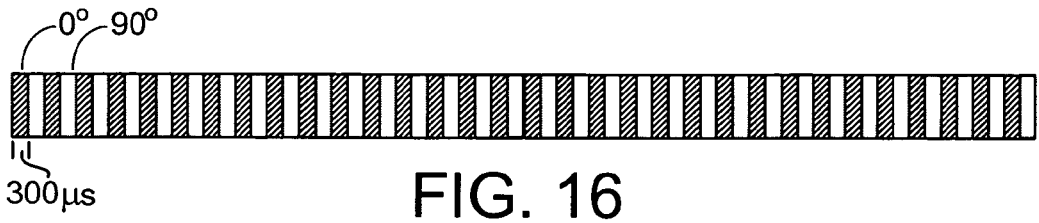

Implementation of blur reduction will now be described with reference to FIG. 16, in which interspersed captures are shown. When system 100' sees a moving object, combining captures from different times may yield incorrect results. All captures for a Z depth calculation may not be at the same distance and active brightness. For example as shown in FIG. 16, a pixel may see the image foreground in one capture and the background in the next capture if an implementation such as shown in the upper portion of FIG. 16 is used. As shown, in such implementation the 0° phase sees foreground but never the background, and a relatively large error results. On the other hand, if the 0° and 90° captures are interspersed frequently as shown in the bottom portion of FIG. 16, object motion has relatively less artifacts because the captures are equally distributed between foreground and background. This desired result can be achieved by switching light phases between dumps.

As noted earlier, it is desirable to support dealiasing. In embodiments of the present invention, the flexibility associated with changing the conditions for data accumulated between dumps allows data collection for two different frequencies within the same frame to implement dealiasing. Memory used to store this data in different accumulators is preferably located on an area of the IC substrate, e.g., 110' external to substrate area occupied by the pixel array.

Figure 17A:
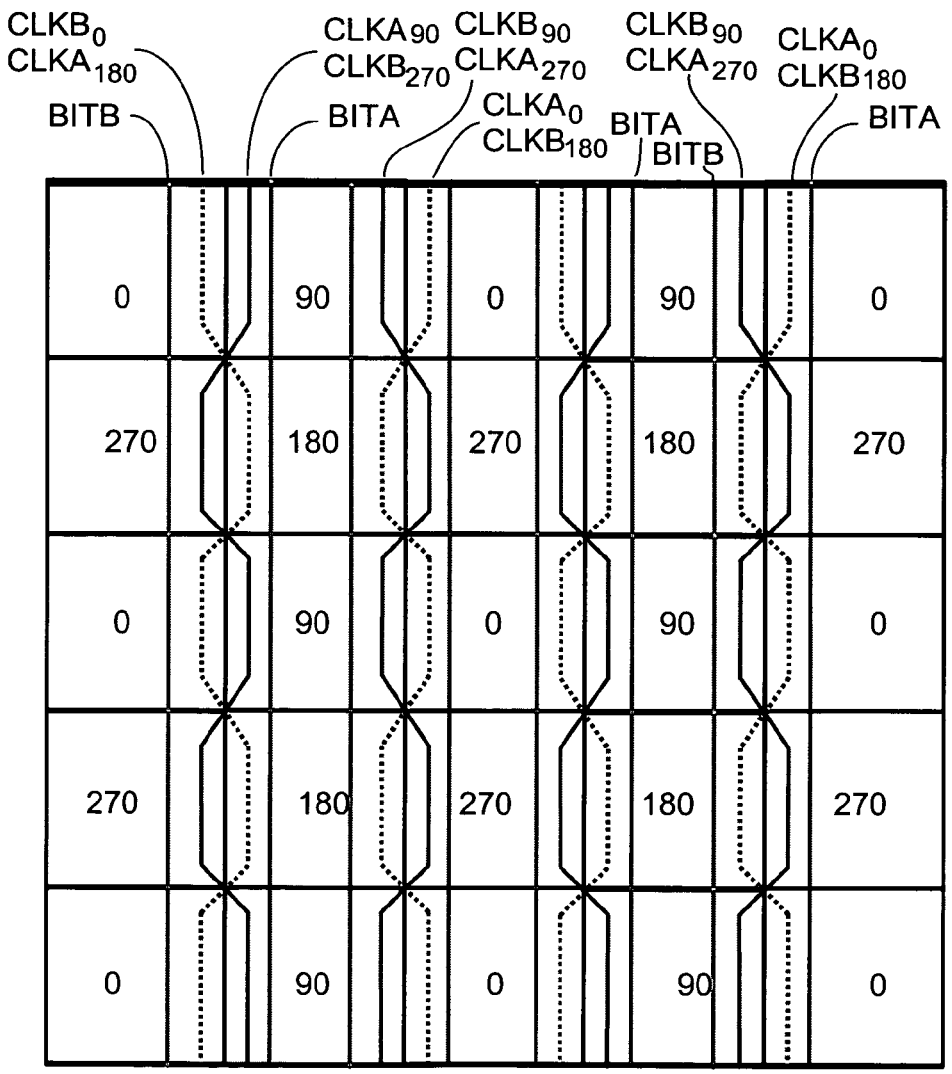
FIG. 17A depicts clock line swapping with neighboring pixels to achieve 0°, 90°, 180°, 270° patterning in neighboring pixels for dealiasing, according to an embodiment of the present invention.

Referring now to FIGS. 17A-17C, various embodiments of the present invention using clock swapping and bitline swapping are described. One goal is to promote symmetry such that common mode noise contributions can be more successfully cancelled out in a differential pixel detector array. As pixel area is reduced according to embodiments of the present invention, more compact IC design can result in increased noise from adjacent clock line signals. However subjecting the pixels to symmetry in their exposure to such noise can permit greater noise reduction, as described herein. Assume two clock signals CLKA and CLKB are used in the detector, and that differential signal outputs appear on two bitlines BITA and BITB. By interchanging CLKA and CLKB clock signals, the light phase can be changed by 180°, i.e. $CLKA_0 = CLKB_{180}$, $CLKB_0 = CLKA_{180}$ and $CLKA_{90} = CLKB_{270}$, $CLKB_{90} = CLKA_{270}$. Neighboring pixels can be patterned to have all four different phases 0°-90°-180°-270° by swapping clock lines every alternate row. In a small sized pixel, it is not possible to swap clock lines within the same pixel. However in an embodiment such as shown in FIG. 17A, one can simply swap clock lines with the left and right neighboring pixels, which also provides better balancing of the clock lines. As such FIG. 17A depicts clock line swapping with neighboring pixels to implement 0°-90°-180°-270° patterning in the neighboring pixels. As such, a cluster of 2×2 pixels can be patterned to have different phases.

In the embodiments shown in FIGS. 17B and 17C, the bitlines can also be swapped to balance bitlines BITA and BITB and equalize the parasitics they see. As shown by FIG. 17B, if bitlines are swapped on each row, similarly to the clock-lines, the same bitline will always be coupled to the same clock line. However this can be less desirable than not switching the bitline at all, as shown in FIG. 17A. However to more fully balance the differential signal, it is preferred to swap bitlines every two rows as shown by FIG. 17C.

From all of the foregoing it will be appreciated that providing more performance and features requires more complexity within a pixel and thus requires more pixel area, but for embodiments of the present invention. In general, more complexity means more cost, but embodiments of the present invention can emulate complex functionality with relatively low overhead implementation, as has been described.

Modifications and variations may be made to the disclosed embodiments without departing from the subject and spirit of the present invention as defined by the following claims.

What is claimed is:

1. A method performed by an electronic processor to enhance performance of a time-of-flight (TOF) system that emits optical energy and detects with an array of pixels, each pixel occupying less than 20 µm×20 µm in pixel area on an IC substrate, at least a fraction of said optical energy reflected by a target object a distance Z away, the method including the following steps:
   (a) digitizing analog detection data obtained from at least some of said pixels during a first operating regime during which at least some of said pixels detect reflected emitted said optical energy during a first integration time interval T1, said digitizing analog detection data obtained from at least some of said pixels during a first operating regime includes acquiring at said TOF system analog detection data during said first operating regime;
   (b) digitizing analog detection data obtained from at least some of said pixels during a second operating regime during which at least some of said pixels detect reflected emitted said optical energy during a second integration time interval T2, said digitizing analog detection data obtained from at least some of said pixels during a second operating regime includes acquiring at said TOF system analog detection data during said second operating regime;
   (c) combining said digitized analog detection data obtained during said first operating regime and during said second operating regime, wherein relative to a different TOF system that uses digitized data during a single detection integration time interval T1+T2, detection performance of said TOF system is enhanced in at least one aspect selected from the group consisting of detection dynamic differential dynamic range, motion blur, 0°-180° offset cancellation, and aliasing interval; and
   (d) outputting three-dimensional information based on said combining, wherein operation of said TOF system is determined by a sequence of symbols, said symbols having at least one characteristic selected from a group consisting of (i) at least one symbol in said sequence is associated with a set of pixel waveforms to be applied to a pixel when said symbol is interpreted to be present, and (ii) at least some said symbols and at least some said waveforms are at least one of modifiable and creatable upon download to said TOF of further parameters.

2. The method of claim 1, wherein step (a) and step (b) include acquiring at said TOF system digitized data at a start of said first operating regime and at a start of said second operating regime, wherein detection performance of said TOF system is enhanced in that at least partial cancellation of kT/C noise is achieved; and
   further including multiplying by a non-integer value a digitized data value acquired at a start of at least said first operating regime, wherein kT/C noise is further reduced.

3. The method of claim 1, wherein a digitized data value obtained at an end of said first operating regime is used as a digitized data value at a beginning of said second operating regime.

4. The method of claim 1, wherein step (a) and step (b) have at least one characteristic selected from a group consisting of (i) said time interval T1 is less than 4 ms and said time interval T2 is less than 4 ms, and (ii) digitizing occurs at a rate at least four faster than an input output (TO) data rate for said IC substrate.

5. The method of claim 1, wherein said IC substrate includes digital bitlines and clock lines, and further including switching said bitlines and said clock lines to reduce effects of noise introduced by digitizing at step (a) and at step (b), wherein a signal-to-noise ratio is enhanced.

6. An enhanced performance time-of-flight (TOF) system that emits optical energy and detects with an array of pixels at least a fraction of said optical energy reflected by a target object a distance Z away, the TOF system including:
   a plurality of pixels, formed on said array, at least some of said pixels having a pixel area occupying less than 20 μm×20 μm in pixel area on an IC substrate that includes said array;
   first means for digitizing analog detection data obtained from at least some of said pixels during a first operating regime during which at least some of said pixels detect reflected emitted said optical energy during a first integration time interval T1;
   second means for digitizing analog detection data obtained from at least some of said pixels during a second operating regime during which at least some of said pixels detect reflected emitted said optical energy during a second integration time interval T2;
   means for combining a digital output from said first means for digitizing and a digital output from said second means for digitizing, wherein relative to a TOF system that uses digitized data during a single detection integration time interval T1+T2, detection performance of said TOF system is enhanced in at least one aspect selected from detection dynamic differential dynamic range, motion blur, 0°-180° offset cancellation, and aliasing interval, wherein said IC substrate includes digital bit-lines and clock lines, and further including means for switching said bit lines and said clock lines to reduce effects of noise introduced by digitizing data, wherein a signal-to-noise ratio is enhanced.

7. The TOF system of claim 6, further including means for governing operation of said TOF system according to a sequence of symbols, wherein at least one symbol in said sequence is associated with a set of pixel waveforms to be applied to a pixel when said symbol is interpreted to be present.

8. The TOF system of claim 6, wherein said time interval T1 is less than 4 ms and said time interval T2 is less than 4 ms.

9. The TOF system of claim 6, wherein said first means for digitizing and said second means for digitizing each digitize a rate at least four faster than an input output (TO) data rate for said IC substrate.

10. A method performed by an electronic processor for detecting motion utilizing a time-of-flight (TOF) system, comprising:
   performing a sequence of operations, said sequence of operations includes a first operation and a second operation, said first operation includes digitizing a first set of analog data acquired from one or more pixel detectors during a first operating regime, said second operation includes digitizing a second set of analog data acquired from said one or more pixel detectors during a second operating regime, said sequence of operations structured to prevent a saturation of said one or more pixel detectors by changing a direction of accumulation during said sequence of operations;
   combining said digitized first set of analog data and said digitized second set of analog data in such a way that said combining implements at least one of reducing motion blur, performing 0°-180° offset cancellation, or dealiasing; and
   outputting three-dimensional information based on said combining.

11. The method of claim 10, wherein:
said second operating regime is performed subsequent to said first operating regime; and
said one or more pixel detectors are implemented as a first part of an integrated circuit, said sequence of operations is performed by circuitry implemented outside said first part.

12. The method of claim 10, wherein:
said first operating regime is associated with a first light phase and said second operating regime is associated with a second light phase different from said first light phase.

13. The method of claim 10, wherein:
said first operating regime is associated with a first emitted light frequency and said second operating regime is associated with a second emitted light frequency different from said first emitted light frequency.

14. The method of claim 10, wherein:
said TOF system is a phase-based TOF system.

15. The method of claim 10, wherein:
said sequence of operations is performed within a frame period.

16. The method of claim 10, wherein:
said sequence of operations includes a common mode reset operation.

17. The method of claim 10, wherein:
said one or more pixel detectors are implemented as a first part of an integrated circuit, said integrated circuit includes bit lines associated with said one or more pixel detectors, a physical layout of said bit lines within said first part includes swapped bit lines.

18. The method of claim 10, wherein:
said one or more pixel detectors are implemented as a first part of an integrated circuit, said integrated circuit includes clock lines in communication with said one or more pixel detectors, a physical layout of said clock lines within said first part includes swapped clock lines.

19. The method of claim 10, wherein:
said performing a sequence of operations includes performing double correlated sampling.

20. The method of claim 10, wherein:
said one or more pixel detectors comprise one or more differential detectors.

* * * * *